(12) United States Patent
Li et al.

(10) Patent No.: US 12,484,073 B2
(45) Date of Patent: Nov. 25, 2025

(54) PROCESSING METHOD, COMMUNICATION DEVICE AND STORAGE MEDIUM

(71) Applicant: SHENZHEN TRANSSION HOLDINGS CO., LTD., Shenzhen (CN)

(72) Inventors: Tian Li, Shenzhen (CN); Chiunwei Huang, Shenzhen (CN); Xingya Shen, Shenzhen (CN); Yili Xie, Shenzhen (CN); Wei Huang, Shenzhen (CN)

(73) Assignee: SHENZHEN TRANSSION HOLDINGS CO., LTD., Shenzhen (CN)

( * ) Notice: Subject to any disclaimer, the term of this patent is extended or adjusted under 35 U.S.C. 154(b) by 0 days.

(21) Appl. No.: 18/640,298

(22) Filed: Apr. 19, 2024

(65) Prior Publication Data

US 2025/0031221 A1    Jan. 23, 2025

Related U.S. Application Data

(63) Continuation of application No. PCT/CN2024/079591, filed on Mar. 1, 2024.

(30) Foreign Application Priority Data

Jul. 18, 2023    (CN) .......................... 202310875608.8

(51) Int. Cl.
*H04W 72/232* (2023.01)
*H04L 5/00* (2006.01)
(Continued)

(52) U.S. Cl.
CPC ......... *H04W 72/232* (2023.01); *H04L 5/0051* (2013.01); *H04W 72/0446* (2013.01); *H04W 72/566* (2023.01)

(58) Field of Classification Search
CPC ............ H04W 72/232; H04W 72/566; H04W 72/0446; H04L 5/0051
See application file for complete search history.

(56) References Cited

U.S. PATENT DOCUMENTS

| 2020/0228190 A1* | 7/2020 | Cirik .................... H04B 7/0695 |
| 2022/0264608 A1 | 8/2022 | Bae et al. |

(Continued)

FOREIGN PATENT DOCUMENTS

| CN | 112152763 A | 12/2020 |
| CN | 113939019 A | 1/2022 |

(Continued)

OTHER PUBLICATIONS

U.S. Appl. No. 63/396,541, filed Aug. 9, 2022. (Year: 2022).*

(Continued)

*Primary Examiner* — Melvin C Marcelo
(74) *Attorney, Agent, or Firm* — Westbridge IP LLC

(57) ABSTRACT

Disclosed are a processing method, a communication device and a storage medium. In technical solutions of the present application, by determining at least one configured grant configuration based on radio resource control signaling and/or downlink control information, a method for determining more than one configured grant configuration is provided, to applicable to the transmissions of at least two configured grant physical uplink shared channels fully/partially overlapping in time domain, thereby improving the uplink throughput and/or reliability during transmission.

16 Claims, 9 Drawing Sheets

(51) Int. Cl.
*H04W 72/0446* (2023.01)
*H04W 72/566* (2023.01)

(56) References Cited

U.S. PATENT DOCUMENTS

| | | | |
|---|---|---|---|
| 2023/0100662 A1 | 3/2023 | Khoshnevisan et al. | |
| 2023/0115082 A1 | 4/2023 | Khoshnevisan et al. | |
| 2023/0254854 A1* | 8/2023 | Cirik | H04L 1/1887 370/336 |
| 2024/0057069 A1* | 2/2024 | Fakoorian | H04L 5/0051 |
| 2024/0098029 A1* | 3/2024 | Khoshnevisan | H04L 47/245 |
| 2024/0179705 A1* | 5/2024 | Lim | H04B 7/024 |
| 2024/0349297 A1* | 10/2024 | Chen | H04L 5/0051 |

FOREIGN PATENT DOCUMENTS

| | | |
|---|---|---|
| CN | 114375008 A | 4/2022 |
| CN | 114765873 A | 7/2022 |
| CN | 115866107 A | 3/2023 |
| CN | 116391422 A | 7/2023 |
| CN | 116419409 A | 7/2023 |
| CN | 116600402 A | 8/2023 |
| WO | 2020062405 A1 | 4/2020 |
| WO | 2022152269 A1 | 7/2022 |

OTHER PUBLICATIONS

First Office Action issued in counterpart Chinese Patent Application No. 202310875608.8, dated Aug. 19, 2023.
International Search Report and Written Opinion issued in corresponding PCT Application No. PCT/CN2024/079591, dated May 7, 2024.
MediaTek Inc., Simultaneous transmission across multiple UE panels, R1-2301582, 3GPP TSG RAN WG1 #112, dated Feb. 16, 2023.
Notification to Grant Patent Right for Invention issued in counterpart Chinese Patent Application No. 202310875608.8, dated Oct. 20, 2023.
Second Office Action issued in counterpart Chinese Patent Application No. 202310875608.8, dated Sep. 17, 2023.
Third Office Action issued in counterpart Chinese Patent Application No. 202310875608.8, dated Sep. 29, 2023.

* cited by examiner

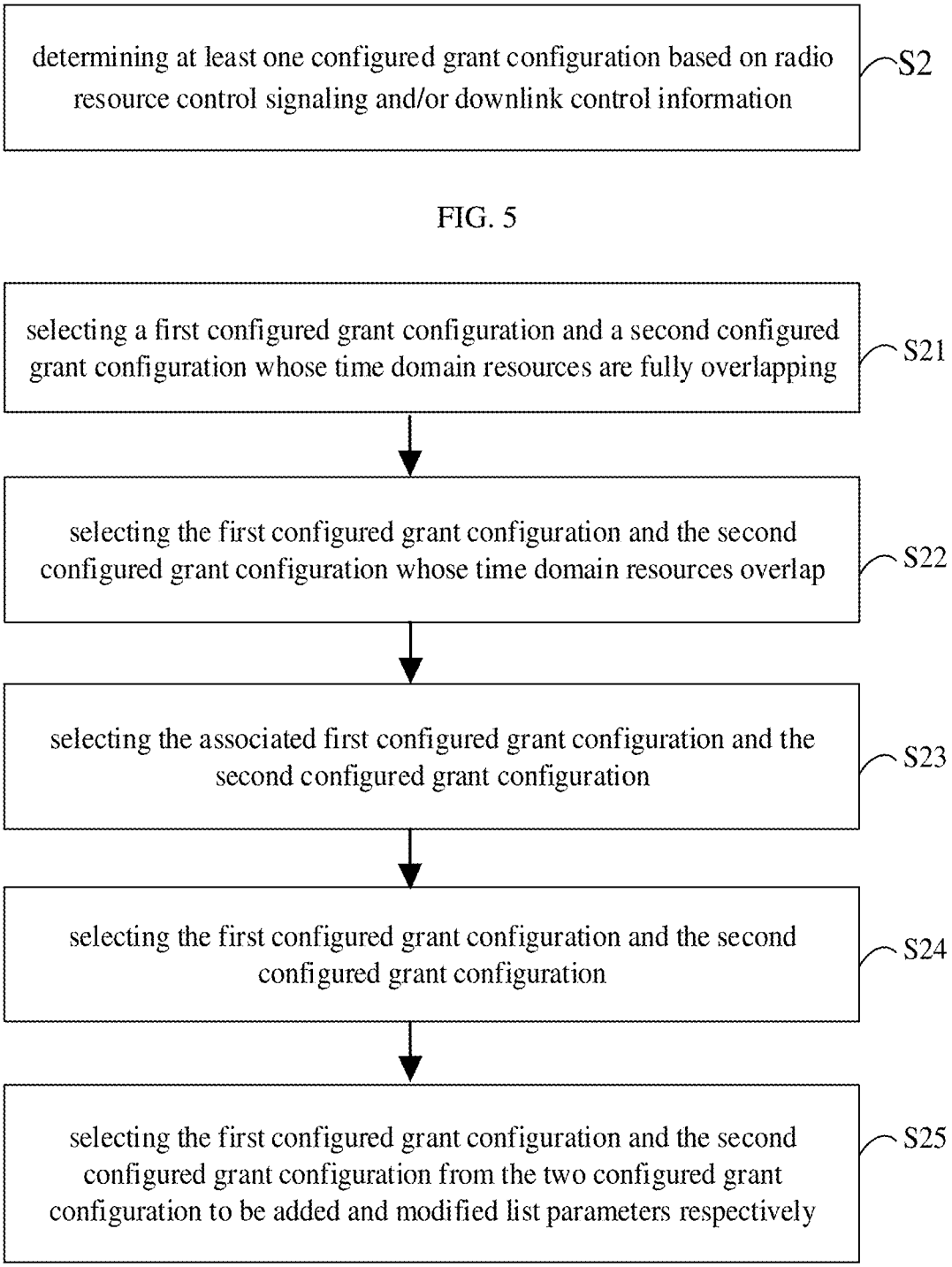

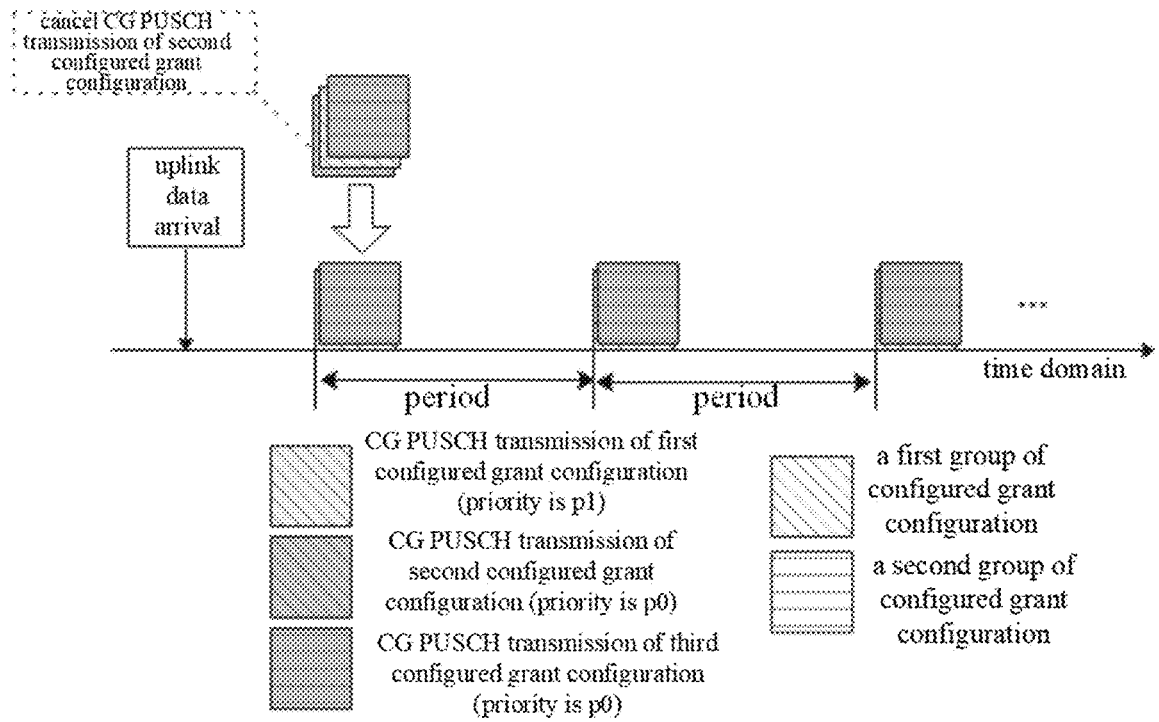

FIG. 10 performing at least one configured grant physical uplink shared channel transmission based on at least one configured grant configuration ⟶S3

FIG. 11 sending radio resource control signaling and/or downlink control information, so that the terminal device determines at least one configured grant configuration based on the radio resource control signaling and/or downlink control information ⟶S1

FIG. 12

PROCESSING METHOD, COMMUNICATION DEVICE AND STORAGE MEDIUM

CROSS-REFERENCE TO RELATED APPLICATIONS

This application is a continuation application of International Application No. PCT/CN2024/079591, filed on Mar. 1, 2024, which claims priority to Chinese Patent Application No. 202310875608.8, filed on Jul. 18, 2023. The disclosures of the above-mentioned applications are incorporated herein by reference in their entireties.

TECHNICAL FIELD

The present application relates to the technical field of communication, and in particular, to a processing method, a communication device and a storage medium.

BACKGROUND

In the existing specification, at a certain moment, the terminal device only supports single-panel uplink transmission. In order to improve resource utilization, multiple panels based uplink simultaneous transmissions include multiple panels based configured grant physical uplink shared channel simultaneous transmissions. Configured grant physical uplink shared channel includes configured grant type 1 physical uplink shared channel and configured grant type 2 physical uplink shared channel transmission.

During the process of conceiving and implementing this application, the inventor found that there are at least the following problems: the above method can only determine one configured grant configuration at a time, and cannot determine more than one configured grant configuration.

The preceding description is intended to provide general background information and does not necessarily constitute related art.

SUMMARY

The main objective of the present application is to provide a processing method, a communication device and a storage medium, which aims to provide a method for determining more than one configured grant configuration, to applicable to the transmissions of at least two configured grant physical uplink shared channels fully/partially overlapping in time domain, thereby improving the uplink throughput and/or reliability during transmission.

The present application provides a processing method, which can be applied to a terminal device (such as a mobile phone), including following steps:

S2, determining at least one configured grant configuration based on radio resource control signaling and/or downlink control information.

In an embodiment, the method for determining the configured grant configuration includes at least one of the following:
selecting a first configured grant configuration and a second configured grant configuration whose time domain resources are fully overlapping;
selecting the first configured grant configuration and the second configured grant configuration whose time domain resources overlap;
selecting the associated first configured grant configuration and second configured grant configuration;
selecting the first configured grant configuration and the second configured grant configuration from the two configured grant configuration to be added and modified list parameters respectively;
selecting the first configured grant configuration and the second configured grant configuration with the same priority;
selecting the first configured grant configuration and the second configured grant configuration with different priorities; and
dividing the configured grant configuration into a first group of configured grant configuration and a second group of configured grant configuration, and selecting the first configured grant configuration and the second configured grant configuration based on a first pre-defined rule.

In an embodiment, the dividing the configured grant configuration into the first group of configured grant configuration and the second group of configured grant configuration includes at least one of the following:
dividing the configured grant configuration into the first group of configured grant configuration and the second group of configured grant configuration based on a value of control resource set (CORESET) pool index parameter; and
dividing the configured grant configuration into the first group of configured grant configuration and the second group of configured grant configuration based on a sounding reference signal (SRS) resource set index.

In an embodiment, the selecting the first configured grant configuration and the second configured grant configuration based on the first pre-defined rule includes at least one of the following:
in response to that the first group of configured grant configuration only includes the first configured grant configuration or the second configured grant configuration, directly selecting the first configured grant configuration or the second configured grant configuration;
in response to that the second group of configured grant configuration only includes the first configured grant configuration or the second configured grant configuration, directly selecting the first configured grant configuration or the second configured grant configuration;
in response to that the first group of configured grant configuration at least includes the first configured grant configuration and the second configured grant configuration with different priorities, selecting the first configured grant configuration or the second configured grant configuration with a higher priority;
in response to that the second group of configured grant configuration at least includes the first configured grant configuration and the second configured grant configuration with different priorities, selecting the first configured grant configuration or the second configured grant configuration with a higher priority;
in response to that the first group of configured grant configuration at least includes the first configured grant configuration and the second configured grant configuration with the same priority, selecting the first configured grant configuration or the second configured grant configuration with a smaller value of a configured grant configuration index parameter; and
in response to that the second group of configured grant configuration at least includes the first configured grant configuration and the second configured grant configuration with the same priority, selecting the first configured grant configuration or the second configured grant configuration with a smaller value of the configured grant configuration index parameter.

In an embodiment, values of the SRS resource set index parameter in the first configured grant configuration and the second configured grant configuration are different;
- time domain resources determined by the first configured grant configuration and the second configured grant configuration overlap;
- the first group of configured grant configuration and the second group of configured grant configurations are respectively associated with a first value and a second value of a CORESET pool index parameter; and
- the first group of configured grant configuration and the second group of configured grant configuration are respectively associated with a third value and a fourth value of an SRS resource set index.

In an embodiment, the performing at least one configured grant physical uplink shared channel transmission based on at least one configured grant configuration includes:
- in response to that the physical uplink control channel transmission overlaps with the at least one configured grant physical uplink shared channel transmission in time domain, multiplexing uplink control information transmitted on a physical uplink control channel into the at least one configured grant physical uplink shared channel transmission.

In an embodiment, the multiplexing the uplink control information transmitted on the physical uplink control channel into the at least one configured grant physical uplink shared channel transmission includes at least one of the following:
- dividing uplink transmission into a first group of uplink transmission and a second group of uplink transmission, and performing at least one configured grant physical uplink shared channel transmission based on a second pre-defined rule;
- selecting the configured grant configuration based on the value of CORESET pool index parameter, and multiplexing the uplink control information into the configured grant physical uplink shared channel transmission with the same value of CORESET pool index parameter;
- selecting the configured grant configuration based on the SRS resource set index, and multiplexing the uplink control information into the configured grant physical uplink shared channel transmission with the same SRS resource set index; and
- selecting the configured grant configuration based on transmission configuration indication state, and multiplexing the uplink control information into the configured grant physical uplink shared channel transmission with the same transmission configuration indication state.

In an embodiment, the method further includes at least one of the following:
- cancelling physical uplink control channel transmission;
- values of the SRS resource set index parameter in the first configured grant configuration and the second configured grant configuration are different;
- the corresponding value of CORESET pool index parameter and/or SRS resource set index in the first group of uplink transmission are the same;
- the corresponding value of CORESET pool index parameter and/or SRS resource set index in the second group of uplink transmission are the same;
- the first group of uplink transmission and the second group of uplink transmission are respectively associated with the first value and the second value of the CORESET pool index parameter;
- the first group of uplink transmission and the second group of uplink transmission are respectively associated with the third value and the fourth value of the SRS resource set index;
- dividing the uplink transmission into the first group of uplink transmission and the second group of uplink transmission includes:
- dividing the uplink transmission into the first group of uplink transmission and the second group of uplink transmission based on the value of CORESET pool index parameter; and/or
- dividing the uplink transmission into the first group of uplink transmission and the second group of uplink transmission based on the SRS resource set index;
- the performing at least one configured grant physical uplink shared channel transmission based on the second pre-defined rule includes at least one of the following:
- in response to that a priority of the physical uplink control channel transmission in the first group of uplink transmission is higher than a priority of the first configured grant configuration or the second configured grant configuration in the first group of uplink transmission, multiplexing the uplink control information into the corresponding first configured grant configuration or the second configured grant configuration;
- in response to that a priority of the physical uplink control channel transmission in the second group of uplink transmission is higher than a priority of the first configured grant configuration or the second configured grant configuration in the second group of uplink transmission, multiplexing the uplink control information into the corresponding first configured grant configuration or the second configured grant configuration.

In an embodiment, the cancelling the physical uplink control channel transmission includes at least one of the following:
- in response to that the priority of the physical uplink control channel transmission in the first group of uplink transmission is lower than the priority of the first configured grant configuration or the second configured grant configuration in the first group of uplink transmission, cancelling the physical uplink control channel transmission;
- in response to that the priority of the physical uplink control channel transmission in the second group of uplink transmission is lower than the priority of the first configured grant configuration or the second configured grant configuration in the second group of uplink transmission, cancelling the physical uplink control channel transmission;
- cancelling the physical uplink control channel transmission in the first group of uplink transmission;
- cancelling the physical uplink control channel transmission in the second group of uplink transmission.

In an embodiment, the radio resource control signaling includes at least one of a configured grant configuration information element, a period parameter, a time domain allocation parameter, an SRS resource set index parameter, an associated configured grant configuration index parameter, a configured grant configuration to be added and modified list parameter, a physical layer priority index parameter and a CORESET pool index parameter;
- the downlink control information includes at least one of a priority indication field, a transmission configuration indication field and an SRS resource set indicator field;

the at least one configured grant configuration includes a first configured grant configuration and/or a second configured grant configuration;

the at least one configured grant configuration is configured to transmit at least two configured grant physical uplink shared channels that fully or partially overlap in time domain; and the at least one configured grant configuration includes the SRS resource set index parameter.

In an embodiment, the at least two configured grant physical uplink shared channels fully or partially overlapping in time domain are associated with different values of the CORESET pool index parameter; and the at least two configured grant physical uplink shared channels fully or partially overlapping in time domain are associated with different values of the SRS resource set index parameter.

In an embodiment, the CORESET pool index parameter is associated with the SRS resource set index parameter;

a value of the CORESET pool index parameter is associated with a value of the SRS resource set index parameter;

values of the SRS resource set index parameter in at least two configured grant configurations are different; and the at least two configured grant physical uplink shared channels fully or partially overlapping in time domain are associated to different values of the CORESET pool index parameter, and the association is based on the SRS resource set index parameter in the configured grant configuration.

The present application further provides a processing method, including:

S1, sending radio resource control signaling and/or downlink control information, so that a terminal device determines at least one configured grant configuration based on the radio resource control signaling and/or the downlink control information.

In an embodiment, the method for determining the configured grant configuration includes at least one of the following:

selecting, by the terminal device, a first configured grant configuration and a second configured grant configuration whose time domain resources are fully overlapping;

selecting, by the terminal device, the first configured grant configuration and the second configured grant configuration whose time domain resources overlap;

adding an associated configured grant configuration index parameter, and selecting, by the terminal device, the associated first configured grant configuration and second configured grant configuration;

adding one configured grant configuration to be added and modified list parameter, and selecting, by the terminal device, the first configured grant configuration and the second configured grant configuration from the two configured grant configuration to be added and modified list parameters respectively;

selecting, by the terminal device, the first configured grant configuration and the second configured grant configuration with the same priority;

selecting, by the terminal device, the first configured grant configuration and the second configured grant configuration with different priorities; and dividing, by the terminal device, the configured grant configuration into a first group of configured grant configuration and a second group of configured grant configuration, and selecting the first configured grant configuration and the second configured grant configuration based on a first pre-defined rule.

In an embodiment, the dividing, by the terminal device, the configured grant configuration into the first group of configured grant configuration and the second group of configured grant configuration includes at least one of the following:

dividing, by the terminal device, the configured grant configuration into the first group of configured grant configuration and the second group of configured grant configuration based on a value of CORESET pool index parameter; and dividing, by the terminal device, the configured grant configuration into the first group of configured grant configuration and the second group of configured grant configuration based on an SRS resource set index.

In an embodiment, the radio resource control signaling includes at least one of a configured grant configuration information element, a period parameter, a time domain allocation parameter, an SRS resource set index parameter, an associated configured grant configuration index parameter, a configured grant configuration to be added and modified list parameter, a physical layer priority index parameter and a CORESET pool index parameter;

the downlink control information includes at least one of a priority indication field, a transmission configuration indication field and an SRS resource set indicator field;

the at least one configured grant configuration includes a first configured grant configuration and/or a second configured grant configuration;

the at least one configured grant configuration is configured to transmit at least two fully overlapping or partially overlapping configured grant physical uplink shared channels in time domain; and the at least one configured grant configuration includes the SRS resource set index parameter.

In an embodiment, the at least two configured grant physical uplink shared channels fully or partially overlapping in time domain are associated with different values of the CORESET pool index parameter; and the at least two configured grant physical uplink shared channels fully or partially overlapping in time domain are associated with different values of the SRS resource set index parameter.

In an embodiment, the CORESET pool index parameter is associated with the SRS resource set index parameter;

a value of the CORESET pool index parameter is associated with a value of the SRS resource set index parameter;

values of the SRS resource set index parameter in at least two configured grant configurations are different; and the at least two configured grant physical uplink shared channels fully or partially overlapping in time domain are associated to different values of the CORESET pool index parameter, and the association is based on the SRS resource set index parameter in the configured grant configuration.

The present application further provides a communication device, including: a memory, a processor, and a processing program stored on the memory and executable on the processor, wherein when the processing program is executed by the processor, the steps of any of the above processing methods are implemented.

The communication device in the present application can be a terminal device (such as a mobile phone) or a network device (such as a base station). The specific meaning needs to be clarified according to the context.

The present application also provides a storage medium, a computer program is stored on the storage medium, and when the computer program is executed by a processor, the steps of any of the above processing methods are implemented.

In technical solutions of the present application, by determining at least one configured grant configuration based on radio resource control signaling and/or downlink control information, a method for determining more than one configured grant configuration is provided, to applicable to the transmissions of at least two configured grant physical uplink shared channels fully/partially overlapping in time domain, thereby improving the uplink throughput and/or reliability during transmission.

BRIEF DESCRIPTION OF THE DRAWINGS

The accompanying drawings, which are incorporated in and constitute a part of this specification, illustrate embodiments consistent with the present application and together with the description, serve to explain the principles of the present application. In order to explain the technical solutions of the embodiments of the present application more clearly, the drawings needed to be used in the description of the embodiments will be briefly introduced below. Obviously, for those of ordinary skill in the art, other drawings can be obtained based on these drawings without exerting creative efforts.

FIG. 5 is a schematic flowchart of a processing method according to a first embodiment.

FIG. 6 is a schematic flowchart of a processing method according to a second embodiment.

FIG. 10 is a first principle schematic diagram according to the third embodiment.

FIG. 11 is a schematic flowchart of a processing method according to the fourth embodiment.

FIG. 12 is a schematic flowchart of a processing method according to a fifth embodiment.

Figure 1:
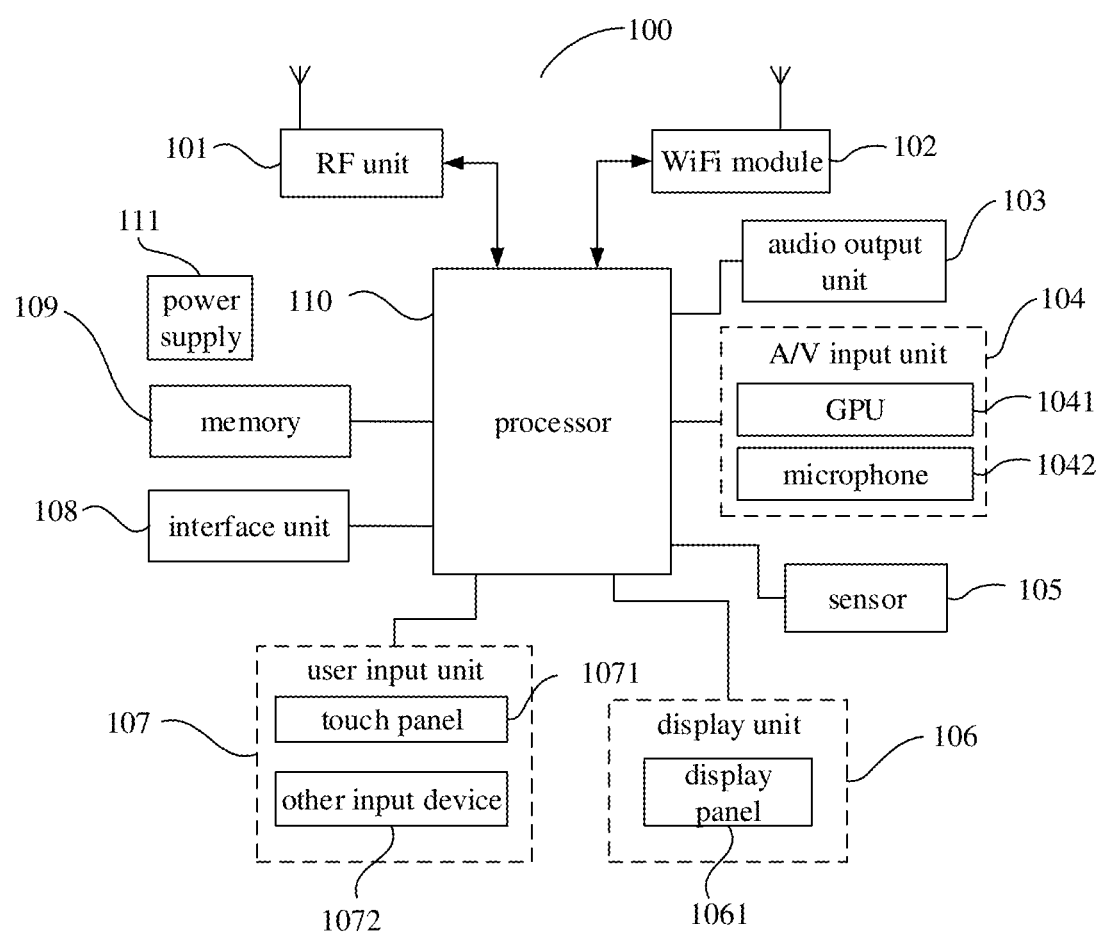
FIG. 1 is a schematic diagram of the hardware structure of a mobile terminal that implements various embodiments of the present application.

The realization of the purpose, functional features and advantages of the present application will be further described with reference to the embodiments and the accompanying drawings. Through the above-mentioned drawings, clear embodiments of the present application have been shown, which will be described in more detail below. These drawings and text descriptions are not intended to limit the scope of the present application's concepts in any way, but are intended to illustrate the present application's concepts for those skilled in the art with reference to specific embodiments.

DETAILED DESCRIPTION OF THE EMBODIMENTS

Exemplary embodiments will be described in detail herein, examples of which are illustrated in the accompanying drawings. When the following description refers to the drawings, unless otherwise indicated, the same numbers in different drawings refer to the same or similar elements. The implementations described in the following exemplary embodiments do not represent all implementations consistent with the present application. Rather, they are merely examples of apparatus and methods consistent with aspects of the present application as detailed in the appended claims.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element. In addition, components, features, and elements with the same name in different embodiments of the present application may have the same or different meanings. Its specific meaning needs to be determined according to its explanation in the specific embodiment or further combined with the context in the specific embodiment.

It should be understood that although the terms first, second, third, etc. may be used herein to describe various information, the information should not be limited to these terms. These terms are only used to distinguish information of the same type from one another. For example, without departing from the scope of this document, first information may also be called second information, and similarly, second information may also be called first information. Depending on the context, the word "if" as used herein may be interpreted as "at" or "when" or "in response to a determination". Furthermore, as used herein, the singular forms "a", "an" and "the" are intended to include the plural forms as well, unless the context indicates otherwise. It should be further understood that the terms "comprising", "including" indicate the existence of features, steps, operations, elements, components, items, species, and/or groups, but does not exclude the existence, occurrence or addition of one or more other features, steps, operations, elements, components, items, species, and/or groups. The terms "or", "and/or", "comprising at least one of" and the like used in the present application may be interpreted as inclusive, or mean any one or any combination. For example, "comprising at least one of: A, B, C" means "any of: A; B; C; A and B; A and C; B and C; A and B and C". As another example, "A, B, or C" or "A, B, and/or C" means "any of the following:

A; B; C; A and B; A and C; B and C; A and B and C". Exceptions to this definition will only arise when combinations of elements, functions, steps or operations are inherently mutually exclusive in some way.

It should be understood that although the various steps in the flowchart in the embodiment of the present application are displayed sequentially as indicated by the arrows, these steps are not necessarily executed sequentially in the order indicated by the arrows. Unless otherwise specified herein, there is no strict order restriction on the execution of these steps, and they can be executed in other orders. Moreover, at least some of the steps in the figure may include multiple sub-steps or multiple stages, these sub-steps or stages are not necessarily executed at the same time, but can be executed at different times. The execution sequence thereof is not necessarily performed sequentially, but may be performed alternately or alternately with at least one part of other steps or sub-steps or stages of other steps.

Depending on the context, the words "if" as used herein may be interpreted as "at" or "when" or "in response to determining" or "in response to detecting". Similarly, depending on the context, the phrases "if determined" or "if detected (the stated condition or event)" could be interpreted as "when determined" or "in response to the determination" or "when detected (the stated condition or event)" or "in response to detection (the stated condition or event)".

It should be noted that in this article, step codes such as S1 and S2 are used for the purpose of expressing the corresponding content more clearly and concisely, and do not constitute a substantive limitation on the order. Those skilled in the art may perform S2 first and then S1 etc. during specific implementation, but these should all be within the protection scope of the present application.

It should be understood that the specific embodiments described here are only used to explain the present application, and are not intended to limit the present application.

In the following description, the use of suffixes such as "module", "part" or "unit" for denoting elements is only for facilitating the description of the present application and has no specific meaning by itself. Therefore, "module", "part" or "unit" may be used in combination.

The mobile terminal can be implemented in various forms. For example, the mobile terminal described in the present application can include a mobile phone, a tablet computer, a notepad computer, a hand-held computer, a personal digital assistants (PDA), a portable media player (PMP), a navigation device, a wearable device, a smart bracelet, a pedometer and other mobile terminals, as well as a fixed terminal device such as a digital TV and a desktop computer.

The present application takes a mobile terminal as an example to illustrate. Those skilled in the art will understand that, in addition to elements specifically used for mobile purposes, the configuration according to the embodiments of the present application can also be applied to the fixed terminal device.

As shown in FIG. 1, FIG. 1 is a schematic structural diagram of a hardware of a mobile terminal according to embodiments of the present application. The mobile terminal 100 can include a Radio Frequency (RF) unit 101, a WiFi module 102, an audio output unit 103, an audio/video (A/V) input unit 104, a sensor 105, a display unit 106, a user input unit 107, an interface unit 108, a memory 109, a processor 110, a power supply 111 and other components. Those skilled in the art can understand that the structure of the mobile terminal shown in FIG. 1 does not constitute a limitation on the mobile terminal. The mobile terminal can include more or fewer components, or a combination of some components, or differently arranged components than shown in the figure.

Hereinafter, each component of the mobile terminal will be specifically introduced with reference to FIG. 1.

The radio frequency unit 101 can be used for transmitting and receiving signals during the process of transceiving information or talking. Specifically, after receiving the downlink information of the base station, the downlink information is processed by the processor 110; in addition, the uplink data is sent to the base station. Generally, the radio frequency unit 101 includes, but is not limited to, an antenna, at least one amplifier, a transceiver, a coupler, a low noise amplifier, a duplexer, and the like. In addition, the radio frequency unit 101 can also communicate with the network and other devices through wireless communication. The above-mentioned wireless communication can use any communication standard or protocol, including but not limited to Global System of Mobile communication (GSM), General Packet Radio Service (GPRS), Code Division Multiple Access 2000 (CDMA2000), Wideband Code Division Multiple Access (WCDMA), Time Division-Synchronous Code Division Multiple Access (TD-SCDMA), Frequency Division Duplexing-Long Term Evolution (FDD-LTE), Time Division Duplexing-Long Term Evolution (TDD-LTE), 5G and 6G, or the like.

Wi-Fi is a short-range wireless transmission technology. The mobile terminal can help users transmit and receive email, browse webpage, and access streaming media through the Wi-Fi module 102, and Wi-Fi provides users with wireless broadband Internet access. Although FIG. 1 shows the Wi-Fi module 102, it is understandable that it is not a necessary component of the mobile terminal and can be omitted as needed without changing the essence of the present application.

When the mobile terminal 100 is in a call signal receiving mode, a call mode, a recording mode, a voice recognition mode, a broadcast receiving mode, or the like, the audio output unit 103 can convert the audio data received by the radio frequency unit 101 or the Wi-Fi module 102 or stored in the memory 109 into an audio signal and output the audio signal as sound. Moreover, the audio output unit 103 can also provide audio output related to a specific function performed by the mobile terminal 100 (for example, call signal reception sound, message reception sound, or the like). The audio output unit 103 can include a speaker, a buzzer, or the like.

The A/V input unit 104 is configured to receive audio or video signals. The A/V input unit 104 can include a graphics processing unit (GPU) 1041 and a microphone 1042. The graphics processing unit 1041 processes image data of still pictures or videos obtained by an image capture device (such as a camera) in a video capture mode or an image capture mode. The processed image frame can be displayed on the display unit 106. The image frame processed by the graphics processing unit 1041 can be stored in the memory 109 (or other storage medium) or sent via the radio frequency unit 101 or the Wi-Fi module 102. The microphone 1042 can receive sound (audio data) in operation modes such as a call mode, a recording mode, a voice recognition mode, and the like, and can process such sound into audio data. The processed audio (voice) data can be converted into a format that can be sent to a mobile communication base station via the radio frequency unit 101 in the case of a call mode for output. The microphone 1042 can implement various types of noise cancellation (or suppression) algorithms to eliminate (or suppress) noise or interference generated during the process of transceiving audio signals.

The mobile terminal 100 also includes at least one sensor 105, such as a light sensor, a motion sensor, and other sensors. Specifically, the light sensor includes an ambient light sensor and a proximity sensor. The ambient light sensor can adjust the brightness of the display panel 1061 according to the brightness of the ambient light. The proximity sensor can turn off the display panel 1061 and/or the backlight when the mobile terminal 100 is moved to the ear. A gravity acceleration sensor, as a kind of motion sensor, can detect the magnitude of acceleration in various directions (usually three axes). The gravity acceleration sensor can detect the magnitude and direction of gravity when it is stationary, and can identify the gesture of the mobile terminal (such as horizontal and vertical screen switching, related games, magnetometer attitude calibration), vibration recognition related functions (such as pedometer, tap), or the like. The mobile terminal can also be equipped with other sensors such as a fingerprint sensor, a pressure sensor, an iris sensor, a molecular sensor, a gyroscope, a barometer, a hygrometer, a thermometer, an infrared sensor and other sensors, which will not be repeated here.

The display unit 106 is configured to display information input by the user or information provided to the user. The display unit 106 can include a display panel 1061, and the display panel 1061 can be configured in the form of a liquid crystal display (LCD), an organic light emitting diode (OLED), or the like.

The user input unit 107 can be configured to receive inputted numeric or character information, and generate key signal input related to user settings and function control of the mobile terminal. Specifically, the user input unit 107 can include a touch panel 1071 and other input devices 1072. The touch panel 1071, also called a touch screen, can collect user touch operations on or near it (for example, the user uses fingers, stylus and other suitable objects or accessories to operate on the touch panel 1071 or near the touch panel 1071), and drive the corresponding connection device according to a preset program. The touch panel 1071 can include two parts: a touch detection device and a touch controller. The touch detection device detects the user's touch position, detects the signal brought by the touch operation, and transmits the signal to the touch controller. The touch controller receives the touch information from the touch detection device, converts the touch information into contact coordinates, and sends it to the processor 110, and can receive and execute the instructions sent by the processor 110. In addition, the touch panel 1071 can be implemented in multiple types such as resistive, capacitive, infrared, and surface acoustic wave. In addition to the touch panel 1071, the user input unit 107 can also include other input devices 1072. Specifically, the other input devices 1072 can include, but are not limited to, one or more of physical keyboard, function keys (such as volume control buttons, switch buttons, etc.), trackball, mouse, joystick, etc., which are not specifically limited here.

Further, the touch panel 1071 can cover the display panel 1061. After the touch panel 1071 detects a touch operation on or near it, the touch operation is transmitted to the processor 110 to determine the type of the touch event, and then the processor 110 provides a corresponding visual output on the display panel 1061 according to the type of the touch event. Although in FIG. 1, the touch panel 1071 and the display panel 1061 are used as two independent components to realize the input and output functions of the mobile terminal, in some embodiments, the touch panel 1071 and the display panel 1061 can be integrated to implement the input and output functions of the mobile terminal, which is not specifically limited here.

The interface unit 108 serves as an interface through which at least one external device can be connected to the mobile terminal 100. For example, the external device can include a wired or wireless earphone port, an external power source (or battery charger) port, a wired or wireless data port, a memory card port, a port for connecting devices with identification modules, an audio input/output (I/O) port, a video I/O port, an earphone port, or the like. The interface unit 108 can be configured to receive input (such as data information, electricity, or the like) from an external device and transmit the received input to one or more elements in the mobile terminal 100 or can be configured to transfer data between the mobile terminal 100 and the external device.

The memory 109 can be configured to store software programs and various data. The memory 109 can mainly include a program storage area and a data storage area. The program storage area can store the operating system, at least one application required by the function (such as sound play function, image play function, etc.), or the like. The data storage area can store data (such as audio data, phone book, etc.) created based on the use of the mobile phone. In addition, the memory 109 can include a high-speed random access memory, and can also include a non-volatile memory, such as at least one magnetic disk storage device, a flash memory device, or other volatile solid-state storage devices.

The processor 110 is a control center of the mobile terminal, and uses various interfaces and lines to connect the various parts of the entire mobile terminal. By running or performing the software programs and/or modules stored in the memory 109, and calling the data stored in the memory 109, various functions and processing data of the mobile terminal are executed, thereby overall monitoring of the mobile terminal is performed. The processor 110 can include one or more processing units; and the processor 110 may integrate an application processor and a modem processor. The application processor mainly processes an operating system, a user interface, an application, or the like, and the modem processor mainly processes wireless communication. It can be understood that the foregoing modem processor may not be integrated into the processor 110.

The mobile terminal 100 can also include a power source 111 (such as a battery) for supplying power to various components. The power supply 111 can be logically connected to the processor 110 through a power management system, so that functions such as charging, discharging, and power consumption management can be managed through the power management system.

Although not shown in FIG. 1, the mobile terminal 100 can also include a Bluetooth module, or the like, which will not be repeated herein.

In order to facilitate the understanding of the embodiments of the present application, the following describes the communication network system on which the mobile terminal of the present application is based.

Figure 2:
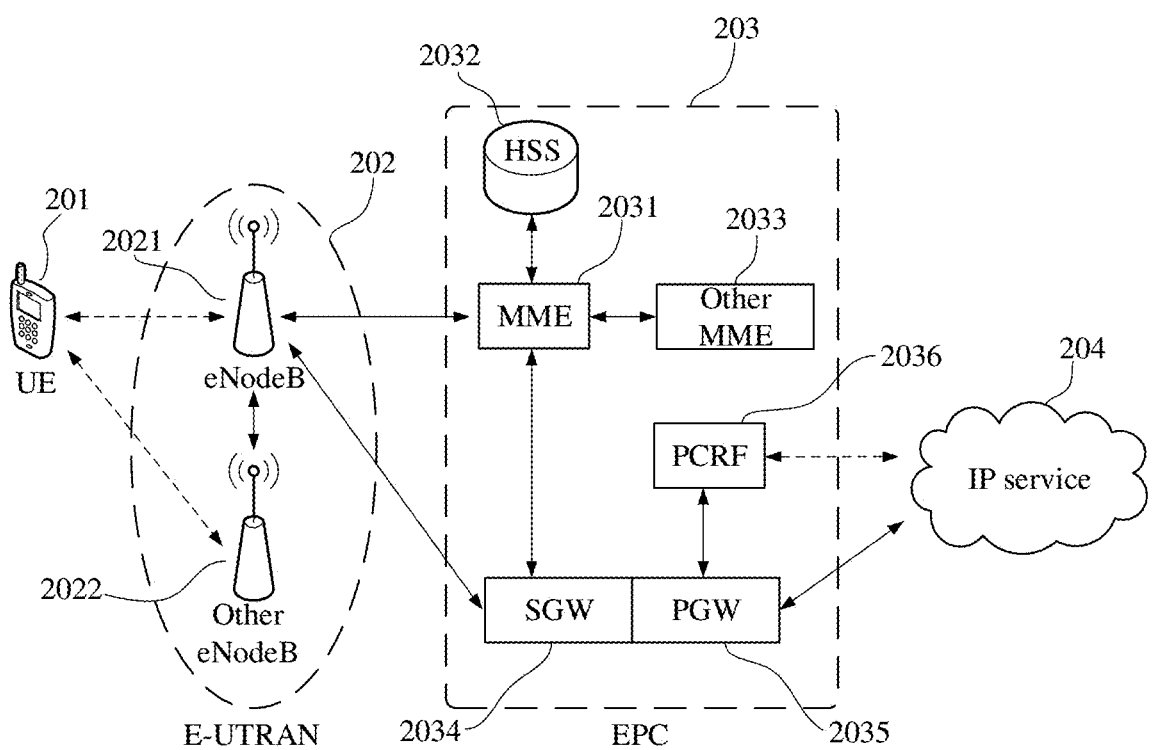
FIG. 2 is a communication network system architecture diagram according to an embodiment of the present application.

As shown in FIG. 2, FIG. 2 is an architecture diagram of a communication network system according to an embodiment of the present application. The communication network system is an LTE system of general mobile communication network technology. The LTE system includes a User Equipment (UE) 201, an Evolved UMTS Terrestrial Radio Access Network (E-UTRAN) 202, an Evolved Packet Core (EPC) 203, and an operator's IP service 204 that are sequentially connected in communication.

In an embodiment, the UE 201 can be the aforementioned terminal 100, which will not be repeated here.

E-UTRAN 202 includes eNodeB 2021 and other eNodeBs 2022. The eNodeB 2021 can be connected to other eNodeBs 2022 through a backhaul (for example, an X2 interface), the eNodeB 2021 is connected to the EPC 203, and the eNodeB 2021 can provide access from the UE 201 to the EPC 203.

The EPC 203 can include Mobility Management Entity (MME) 2031, Home Subscriber Server (HSS) 2032, other MMEs 2033, Serving Gate Way (SGW) 2034, PDN Gate Way (PGW) 2035, Policy and Charging Rules Function (PCRF) 2036, and so on. MME 2031 is a control node that processes signaling between UE 201 and EPC 203, and provides bearer and connection management. HSS 2032 is configured to provide some registers to manage functions such as the home location register (not shown), and save some user-specific information about service feature, data rates, and so on. All user data can be sent through SGW 2034, PGW 2035 can provide UE 201 IP address allocation and other functions. PCRF 2036 is a policy and charging control policy decision point for service data flows and IP bearer resources, which selects and provides available policy and charging control decisions for policy and charging execution functional units (not shown).

The IP service 204 can include Internet, intranet, IP Multimedia Subsystem (IMS), or other IP services.

Although the LTE system is described above as an example, those skilled in the art should know that, the present application is not only applicable to the LTE system, but also applicable to other wireless communication systems, such as GSM, CDMA2000, WCDMA, TD-SCDMA, and new network systems in the future (such as 5G), or the like, which is not limited herein.

Figure 3:
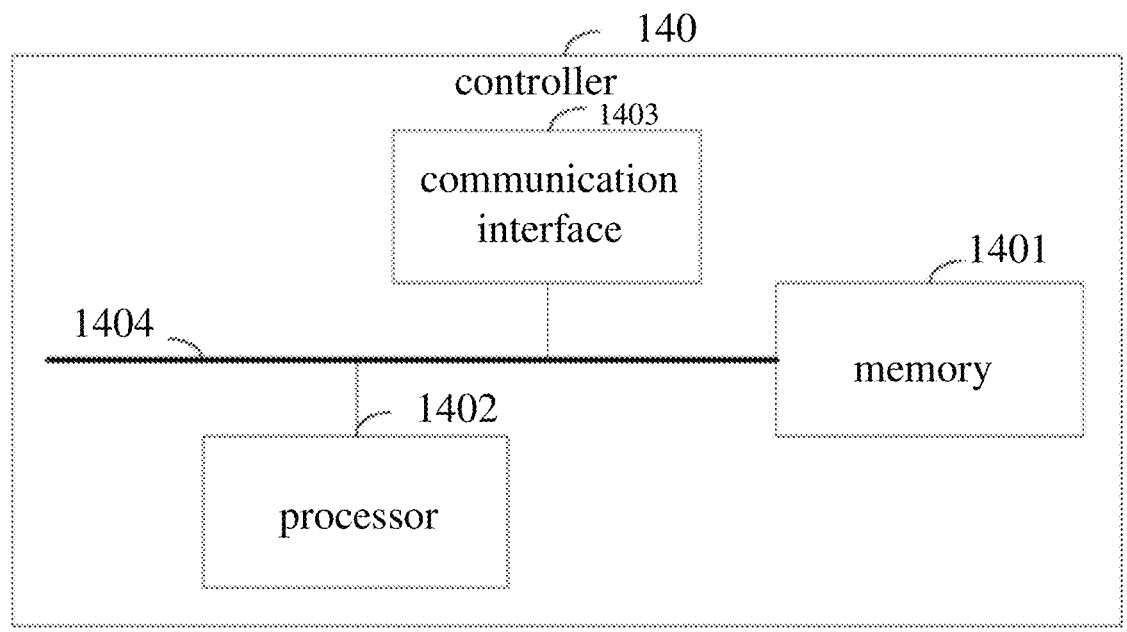
FIG. 3 is a schematic diagram of the hardware structure of a controller 140 according to an embodiment of the present application.

FIG. 3 is a schematic diagram of the hardware structure of a controller provided by the present application. The controller 140 includes a memory 1401 and a processor 1402. The memory 1401 is used to store program instructions. The processor 1402 is used to call the program instructions in the memory 1401 to execute the steps executed by the controller in the first method embodiment. The implementation principles and beneficial effects are similar and will not be described again herein.

In an embodiment, the above-mentioned controller 140 further includes a communication interface 1403, which can be connected to the processor 1402 through a bus 1404. The processor 1402 can control the communication interface 1403 to implement the receiving and sending functions of the controller 140.

Figure 4:
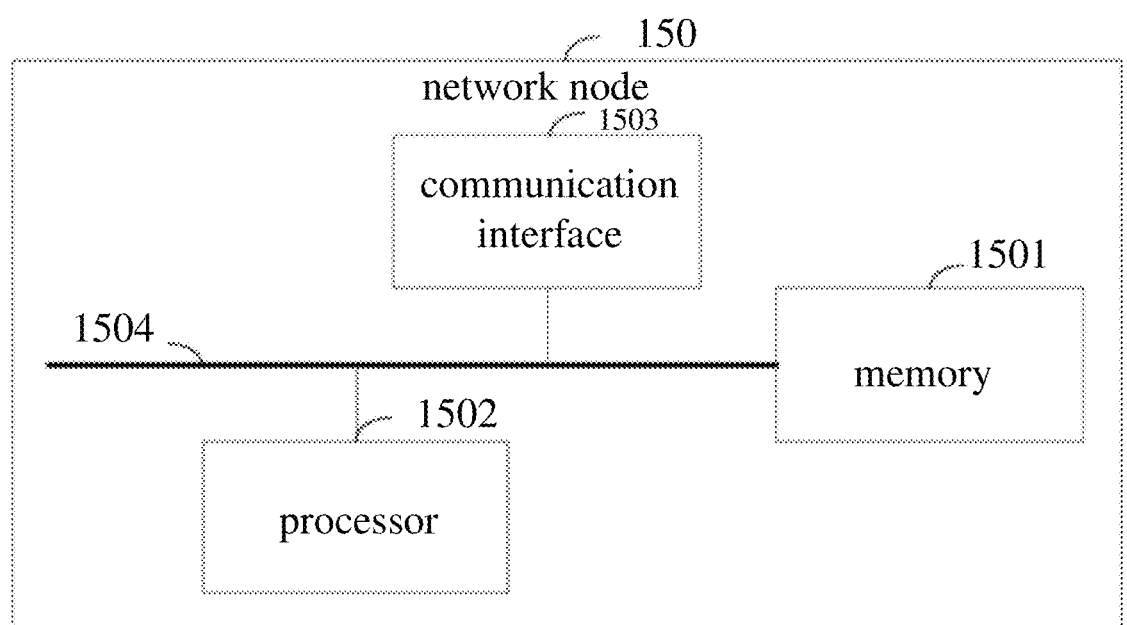
FIG. 4 is a schematic diagram of the hardware structure of a network node 150 according to an embodiment of the present application.

FIG. 4 is a schematic diagram of the hardware structure of a network node 150 provided by the present application. The network node 150 includes a memory 1501 and a processor 1502. The memory 1501 is used to store program instructions. The processor 1502 is used to call the program instructions in the memory 1501 to execute the steps performed by the first node in the first method embodiment. The implementation principles and beneficial effects are similar and will not be described again herein.

In an embodiment, the network node 150 further includes a communication interface 1503, which can be connected to the processor 1502 through a bus 1504. The processor 1502 can control the communication interface 1503 to implement the receiving and transmitting functions of the network node 150.

The above integrated modules implemented in the form of software function modules can be stored in a computer-readable storage medium. The above-mentioned software function module is stored in a storage medium and includes a number of instructions to cause a computer device (which can be a personal computer, a server, or a network device, etc.) or a processor to execute some steps of the method of the present application.

In the above embodiments, it can be implemented in whole or in part by software, hardware, firmware, or any combination thereof. When implemented using software, it may be implemented in whole or in part in the form of a computer program product. The computer program product includes one or more computer instructions. When computer program instructions are loaded and executed on a computer, processes or functions according to embodiments of the present application are generated in whole or in part. The computer may be a general purpose computer, a special purpose computer, a computer network, or other programmable device. Computer instructions may be stored in or transmitted from one computer-readable storage medium to another computer-readable storage medium. For example, computer instructions may be transmitted from one website site, computer, server or data center to another website site, computer, server or data center by wired (e.g., coaxial cable, fiber optic, digital subscriber line (DSL)) or wireless means (such as infrared, wireless, microwave, etc.). Computer-readable storage media can be any available media that can be accessed by a computer or a data storage device such as a server, data center, or other integrated media that contains one or more available media. Available media may be magnetic media (e.g., floppy disk, storage disk, tape), optical media (e.g., DVD), or semiconductor media (e.g., Solid State Disk (SSD)), etc.

Based on the above-mentioned mobile terminal hardware structure and communication network system, various embodiments of the present application are proposed.

First Embodiment

As shown in FIG. 5, FIG. 5 is a schematic flowchart of a processing method according to the first embodiment. The processing method in the embodiment of the present application can be applied to a terminal device (such as a mobile phone), and includes the steps:

S2: determining at least one configured grant configuration based on radio resource control signaling and/or downlink control information.

In an embodiment of the present application, a resource configuration and allocation method of configured grant physical uplink shared channel (CG PUSCH) is provided, taking the configured grant physical uplink shared channel including configured grant type 1 uplink shared channel and configured grant type 2 uplink shared channel transmission as an example.

In an embodiment, the radio resource control (RRC) signaling includes at least one of a configured grant configuration information element, a period parameter, a time domain allocation parameter, a sounding reference signal (SRS) resource set index parameter, an associated configured grant configuration index parameter, a configured grant configuration to be added and modified list parameter, a physical layer priority index parameter and a control resource set (CORESET) pool index parameter.

In an embodiment, the downlink control information includes at least one of a priority indication field, a transmission configuration indication field and an SRS resource set indicator field.

In an embodiment, the configured grant configuration includes a first configured grant configuration and/or a second configured grant configuration.

In an embodiment, the configured grant configuration is configured to perform at least one configured grant physical uplink shared channel transmission.

In an embodiment, at least one configured grant configuration is used for transmissions of at least two configured grant physical uplink shared channels fully or partially overlapping in time domain.

In an embodiment, at least one configured grant configuration includes an SRS resource set index parameter.

In an embodiment, the configured grant physical uplink shared channel transmission contains configured grant type 1 physical uplink shared channel (CG Type 1 PUSCH) and configured grant type 2 physical uplink shared channel transmission (CG Type 2 PUSCH). When the configured grant configuration information element (e.g., ConfiguredGrantConfig) received by the terminal device includes radio resource control configured uplink grant information element (e.g., rrc-ConfiguredUplinkGrant), CG Type 1 PUSCH transmission is configured semi-statically and can be performed without detecting the uplink grant in the downlink control information (DCI). And/or, when the configured grant configuration information element received by the terminal device does not contain the radio resource control uplink grant information element, the CG Type 2 PUSCH transmission is semi-persistently scheduled by an UL grant in a valid activation DCI. In the active bandwidth part (BWP, Bandwidth Part) of a serving cell, more than one configured grant configuration for CG Type 1 PUSCH and/or CG Type 2 PUSCH transmission can be active simultaneously.

In an embodiment, the configured grant configuration is indicated by the configured grant configuration information element. The configured grant configuration and/or the uplink grant in DCI determines the resources for CG PUSCH transmission, such as time domain and frequency domain resources. For multiple panels based configured grant uplink simultaneous transmission, if the configured grant uplink simultaneous transmission is the simultaneous transmission of two CG Type 1 PUSCHs, the terminal device needs to determine the resources for the two CG PUSCH transmissions through the two configured grant configurations to achieve the simultaneous transmission of the two CG PUSCHs. Therefore, 2 configured grant configurations need to be configured for two CG PUSCHs transmitted simultaneously to determine the resources for two CG PUSCHs transmitted simultaneously.

In an embodiment, perform multiple panels based configured grant uplink simultaneous transmission in the scenario of multiple DCIs based multiple network devices, the network devices can include transmission and reception points (TRP, Transmission/Reception Point). In an embodiment, in the scenario of multiple network devices based on multiple DCIs, the value of the CORESET pool index parameter includes a first value (e.g., 0) and a second value (e.g., 1).

In an embodiment, two configured grant configurations whose time domain resources are fully overlapping are selected to transmit two CG PUSCHs simultaneously. In an embodiment, the time domain resources of one CG PUSCH transmission are determined by the starting symbol and duration of the CG PUSCH transmission.

In an embodiment, the time domain resources determined by the two configured grant configurations can be the same based on the same value of at least one of the following parameters: the period parameter (e.g., periodicity) in the configured grant configuration information element, the time domain allocation parameter (e.g., timeDomainAllocation) in the radio resource control configured uplink grant information element in the configured grant configuration information element, the time domain offset parameter (e.g., timeDomainOffset) in the radio resource control configured uplink grant information element in the configured grant configuration information element and the time reference system frame number parameter (e.g., timeReferenceSFN) in the radio resource control configured uplink grant information element in the configured grant configuration information element, etc.

In an embodiment, two configured grant configurations whose time domain resources overlap are selected to transmit two CG PUSCHs simultaneously. In an embodiment, the time domain resources of one CG PUSCH transmission are determined by the starting symbol and duration of the CG PUSCH transmission.

In an embodiment, two associated configured grant configurations are selected to transmit two CG PUSCHs simultaneously.

In an embodiment, two configured grant configurations are selected to transmit two CG PUSCHs simultaneously.

In an embodiment, one configured grant configuration is selected from the two configured grant configuration to be added and modified list parameters (e.g., configuredGrantConfigToAddModList) to transmit two CG PUSCHs simultaneously.

In this embodiment, through the above solution, by determining at least one configured grant configuration based on radio resource control signaling and/or downlink control information, a method for determining more than one configured grant configuration is provided, to applicable to the transmissions of at least two configured grant physical uplink shared channels fully/partially overlapping in time domain, thereby improving the uplink throughput and/or reliability during transmission.

Second Embodiment

On the basis of the first embodiment of the present application, this embodiment discloses the specific method for determining at least one configured grant configuration based on radio resource control signaling and/or downlink control information. As shown in FIG. 6, FIG. 6 is a schematic flowchart of a processing method according to the second embodiment, which shows a method for determining at least one configured grant configuration, including at least one of the following:

S21, selecting a first configured grant configuration and a second configured grant configuration whose time domain resources are fully overlapping;

In an embodiment, the values of the SRS resource set index parameter in the first configured grant configuration and the second configured grant configuration are different.

In an embodiment, the at least two configured grant physical uplink shared channels fully or partially overlapping in time domain are associated with different values of the SRS resource set index parameter.

In an embodiment, the SRS resource set index parameter in at least two configured grant configurations have different values.

In an embodiment, the CG PUSCHs determined by the two configured grant configurations are respectively transmitted to two different network devices, and the Hybrid Automatic Repeat-reQuest (HARQ) process indexes of the two CG PUSCHs are different.

In an embodiment, the same time domain resources means that at least one of the following is the same: the starting symbol of CG PUSCH transmission, the starting symbol S which is determined from the time domain resource allocation table by the row index determined by the value of the time domain allocation parameter, the duration which is determined from the time domain resource allocation table by the row index determined by the value of the time domain allocation parameter, the period of CG PUSCH transmission, etc.

In an embodiment, the starting symbol of the Nth (N≥0) CG Type 1 PUSCH transmission determined by one configured grant configuration is determined by the following formula:

[(system frame number×number of slots per frame×
number of symbols per slot)+(slot number in
the system frame number×number of symbols
per slot)+symbol number in the slot]=(time reference system frame number×number of slots
per frame×number of symbols per slot+time
domain offset×number of symbols per slot+
starting symbol S+N×period) mod(1024×number of slots per frame×number of symbols per
slot)

In an embodiment, the number of slots per frame (i.e., numberOfSlotsPerFrame) and the number of symbols per slot (i.e., numberOfSymbolsPerSlot) are pre-defined parameters determined in the TS38.211 specification, the time reference system frame number is determined by the value of the time reference system frame number parameter, and the time domain offset is determined by the value of the time domain offset parameter, the period is determined by the value of the period parameter, the starting symbol S is determined from the time domain resource allocation table by the row index determined by the value of the time domain allocation parameter.

In an embodiment of the present application, the following two methods can be used to make the time domain resources determined by the two configured grant configurations the same:

Method 1: the time domain resources determined by the two configured grant configurations are the same based on the same value of at least one of the following parameters: the period parameter (e.g., periodicity) in the configured grant configuration information element, the time domain allocation parameter (e.g., timeDomainAllocation) in the radio resource control configured uplink grant information element in the configured grant configuration information element, the time domain offset parameter (e.g., timeDomainOffset) in the radio resource control configured uplink grant information element in the configured grant configuration information element, and the time reference system frame number parameter (e.g., timeReferenceSFN) in the radio resource control configured uplink grant information element in the configured grant configuration information element, etc.

If the same time domain resource is determined by configuring the same value of a parameter (e.g., time domain allocation parameter), the terminal device selects two configured grant configurations from multiple active configured grant configurations. In an embodiment, the values of the time domain allocation parameter corresponding to these two configured grant configurations are the same. Therefore, the time domain resources determined by these two configured grant configurations are the same. In an embodiment, the values of the SRS resource set index parameter in the two configured grant configurations are different.

If the same time domain resources are determined by configuring the same values of the four parameters (e.g., period parameter, time domain allocation parameter, time domain offset parameter, and time reference system frame number parameter), the terminal device selects 2 configured grant configurations from multiple active configured grant configurations. In an embodiment, the values of the period parameter, time domain allocation parameter, time domain offset parameter and time reference system frame number parameter corresponding to these two configured grant configurations are the same. Therefore, the time domain resources determined by these two configured grant configurations are the same. In an embodiment, the values of the SRS resource set index parameter in the two configured grant configurations are different.

Method 2: the time domain resources determined by the two configured grant configurations are the same based on the value of at least one of the following parameters: the period parameter (e.g., periodicity) in the configured grant configuration information element, the time domain allocation parameter (e.g., timeDomainAllocation) in the radio resource control configured uplink grant information element in the configured grant configuration information element, the time domain offset parameter (e.g., timeDomainOffset) in the radio resource control configured uplink grant information element in the configured grant configuration information element and the time reference system frame number parameter (e.g., timeReferenceSFN) in the radio resource control configured uplink grant information element in the configured grant configuration information element, etc.

Figure 7:
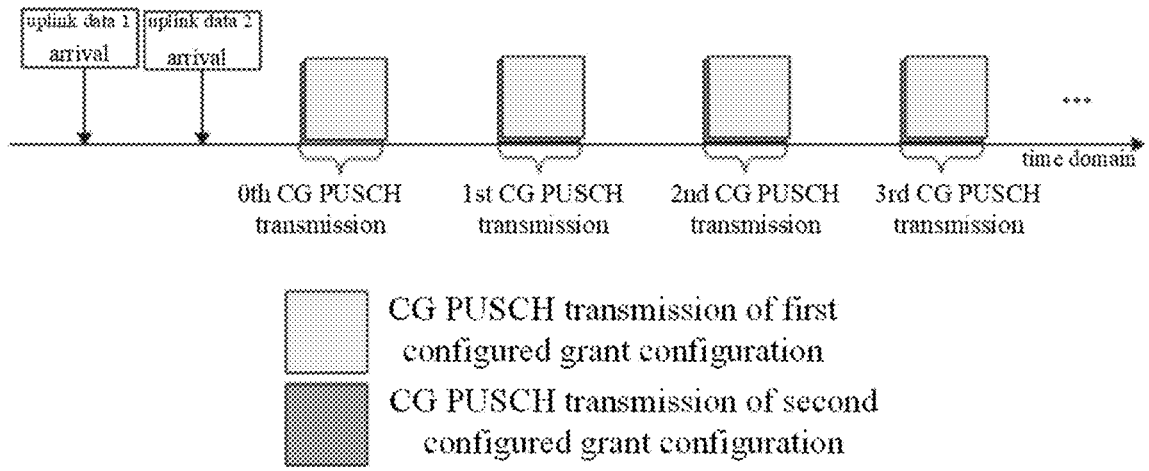
FIG. 7 is a first principle schematic diagram according to the second embodiment.

In an embodiment, the time domain resources in Method 2 are the same by configuring the above parameters to make at least one of the following the same: the starting symbol of CG PUSCH transmission, the duration which is determined from the time domain resource allocation table by the row index determined by the value of the time domain allocation parameter, the period of CG PUSCH transmission, etc. As shown in FIG. 7, FIG. 7 is a first principle schematic diagram according to the second embodiment.

In an embodiment, the starting symbol of the Nth (N≥0) CG Type 1 PUSCH transmission determined by one configured grant configuration is determined by the following formula:

[(system frame number×number of slots per frame×
number of symbols per slot)+(slot number in
the system frame number×number of symbols
per slot)+symbol number in the slot]=(time reference system frame number×number of slots
per frame×number of symbols per slot+time
domain offset×number of symbols per slot+
starting symbol S+N×period) mod(1024×number of slots per frame×number of symbols per
slot)

In an embodiment, the number of slots per frame (i.e., numberOfSlotsPerFrame) and the number of symbols per slot (i.e., numberOfSymbolsPerSlot) are pre-defined parameters determined in the TS38.211 specification, the time reference system frame number is determined by the value of the time reference system frame number parameter, the time domain offset is determined by the value of the time domain offset parameter, the period is determined by the value of the period parameter, the starting symbol S is determined from the time domain resource allocation table by the row index determined by the value of the time domain allocation parameter.

S22, selecting the first configured grant configuration and the second configured grant configuration whose time domain resources overlap.

In an embodiment, two configured grant configurations whose time domain resources overlap are selected to transmit two CG PUSCHs simultaneously. In an embodiment, the time domain resources of one CG PUSCH transmission are determined by the starting symbol and duration of the CG PUSCH transmission.

In an embodiment, the SRS resource set index parameter (e.g., srs-ResourceSetIndex-r18) in the two configured grant configurations have different values. In an embodiment, the values of the SRS resource set index parameter are 0 and 1 respectively.

In an embodiment, the at least two configured grant physical uplink shared channels fully or partially overlapping in time domain are associated with different values of the SRS resource set index parameter.

In an embodiment, at least one configured grant configuration is used for transmissions of at least two configured grant physical uplink shared channels fully or partially overlapping in time domain.

In an embodiment, two of the at least two configured grant physical uplink shared channels fully or partially overlap in time domain.

In an embodiment, the two configured grant physical uplink shared channels are respectively transmitted based on the first configured grant configuration and the second configured grant configuration.

In an embodiment, since the SRS resource set index parameter in the two configured grant configurations have different values, at least two configured grant physical uplink shared channels fully or partially overlapping in time domain are associated with different values of the SRS resource set index parameter.

In an embodiment, the CG PUSCHs determined by the two configured grant configurations are respectively transmitted to two different network devices, and the HARQ process indexes of the two CG PUSCHs are different.

In an embodiment, the starting symbol of the Nth (N≥0) CG Type 1 PUSCH transmission determined by one configured grant configuration is determined by the following formula:

[(system frame number×number of slots per frame×
  number of symbols per slot)+(slot number in
  the system frame number×number of symbols
  per slot)+symbol number in the slot]=(time reference system frame number×number of slots
  per frame×number of symbols per slot+time
  domain offset×number of symbols per slot+
  starting symbol S+N×period) mod(1024×number of slots per frame×number of symbols per
  slot)

In an embodiment, the number of slots per frame (i.e., numberOfSlotsPerFrame) and the number of symbols per slot (i.e., numberOfSymbolsPerSlot) are pre-defined parameters determined in the TS38.211 specification, the time reference system frame number is determined by the value of the time reference system frame number parameter, the time domain offset is determined by the value of the time domain offset parameter, the period is determined by the value of the period parameter, the starting symbol S is determined from the time domain resource allocation table by the row index determined by the value of the time domain allocation parameter.

In an embodiment, the duration of the Nth (N>=0) CG Type 1 PUSCH transmission determined by one configured grant configuration is determined from the time domain resource allocation table by the row index determined by the value of the time domain allocation parameter.

Figure 8:
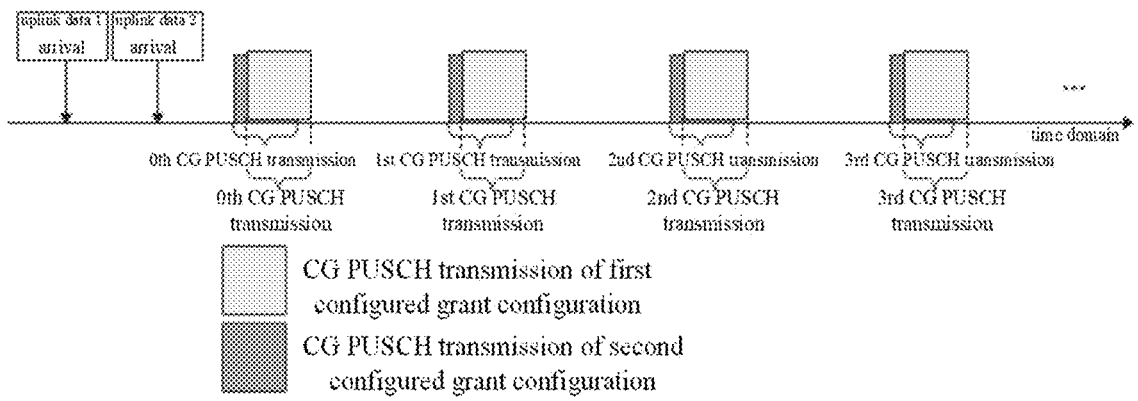
FIG. 8 is a second principle schematic diagram according to the second embodiment.

In an embodiment, as shown in FIG. 8, FIG. 8 is a second principle schematic diagram according to the second embodiment, the time domain resources determined by the two configured grant configurations, that is: time domain resources for CG PUSCH transmission determined by two configured grant configurations, the overlap of time domain resources for CG PUSCH transmission determined by the two configured grant configurations includes two cases: the fully overlapping time domain resources and the partially overlapping time domain resources. The fully overlapping time domain resources are shown in FIG. 7, and the partially overlapping time domain resources are shown in FIG. 8.

In an embodiment, the CG PUSCH transmission periods determined by the two configured grant configurations are the same, that is, the value of the period parameter (e.g., periodicity) in the configured grant configuration information element is the same.

S23, selecting the associated first configured grant configuration and the second configured grant configuration.

In an embodiment, two associated configured grant configurations are selected to transmit two CG PUSCHs simultaneously.

In an embodiment, the SRS resource set index parameter (e.g., srs-ResourceSetIndex-r18) in the two configured grant configurations have different values. In an embodiment, the values of the SRS resource set index parameter are respectively a third value (e.g., 0) and a fourth value (e.g., 1).

In an embodiment, the at least two configured grant physical uplink shared channels fully or partially overlapping in time domain are associated with different values of the SRS resource set index parameter.

In an embodiment, the CG PUSCHs determined by the two configured grant configurations are respectively transmitted to two different network devices, and the HARQ process indexes of the two CG PUSCHs are different.

In an embodiment, the method for associating two configured grant configurations include: adding the associated configured grant configuration index parameter (e.g., associatedConfiguredGrantConfigIndex-r18) in the configured grant configuration information element or the radio resource control configured uplink grant information element in the configured grant configuration information element, in order to indicate the configured grant configuration index of the associated configured grant configuration, and obtain the associated configured grant configuration according to the configured grant configuration index, thereby obtaining two configured grant configurations.

In an embodiment, the time domain resources determined by the two selected configured grant configurations overlap, that is: the time domain resources of CG PUSCH transmission determined by the two configured grant configurations overlap, including the two cases: the time domain resources being fully overlapping or being partially overlapping. In an embodiment, the time domain resource of one CG PUSCH transmission is determined by the starting symbol and duration of CG PUSCH transmission. In an embodiment, the CG PUSCH transmission periods determined by the two configured grant configurations are the same, that is, the value of the period parameter (e.g., periodicity) in the configured grant configuration information element is the same.

S24, selecting the first configured grant configuration and the second configured grant configuration.

In an embodiment, the SRS resource set index parameter (e.g., srs-ResourceSetIndex-r18) in the two configured grant configurations have different values. In an embodiment, the values of the SRS resource set index parameter are 0 and 1 respectively.

In an embodiment, the at least two configured grant physical uplink shared channels fully or partially overlapping in time domain are associated with different values of the SRS resource set index parameter.

In an embodiment, at least one configured grant configuration is used for transmissions of at least two configured grant physical uplink shared channels fully or partially overlapping in time domain.

In an embodiment, two of the at least two configured grant physical uplink shared channels fully or partially overlap in time domain.

In an embodiment, the two configured grant physical uplink shared channels are respectively transmitted based on the first configured grant configuration and the second configured grant configuration.

In an embodiment, since the SRS resource set index parameter in the two configured grant configurations have different values, at least two configured grant physical uplink shared channels fully or partially overlapping in time domain are associated with different values of the SRS resource set index parameter.

In an embodiment, the CG PUSCHs determined by the two configured grant configurations are respectively transmitted to two different network devices, and the HARQ process indexes of the two CG PUSCHs are different.

In an embodiment, the time domain resources determined by the two selected configured grant configurations overlap, that is: the time domain resources of CG PUSCH transmission determined by the two configured grant configurations overlap, including the two cases: the time domain resources being fully overlapping or being partially overlapping. In an embodiment, the time domain resource of 1 CG PUSCH transmission is determined by the starting symbol and duration of CG PUSCH transmission. In an embodiment, the CG PUSCH transmission periods determined by the two configured grant configurations are the same, that is, the value of the period parameter (e.g., periodicity) in the configured grant configuration information element is the same.

S25, selecting the first configured grant configuration and the second configured grant configuration from the two configured grant configuration to be added and modified list parameters respectively.

In an embodiment, one configured grant configuration is selected from the two configured grant configuration to be added and modified list parameters (e.g., configuredGrantConfigToAddModList) for simultaneous transmission of two CG PUSCHs.

In an embodiment, a configured grant configuration to be added and modified list parameter (e.g., configuredGrantConfigToAddModList2-r18) is added in the uplink dedicated bandwidth part information element (i.e., BWP-UplinkDedicated). The value of the SRS resource set index parameter (e.g., srs-ResourceSetIndex-r18) in the configured grant configuration in the first configured grant configuration to be added and modified list (e.g., configuredGrantConfigToAddModList-r16) is different from the value of the SRS resource set index parameter in the configured grant configuration in the second configured grant configuration to be added and modified list parameter (e.g., configuredGrantConfigToAddModList2-r18). In an embodiment, the value of the SRS resource set index parameter in the configured grant configuration in the first configured grant configuration to be added and modified list parameter is 0, and the value of the SRS resource set index parameter in the configured grant configuration in the second configured grant configuration to be added and modified list parameter is 1.

In an embodiment, the two selected configured grant configurations contain different values for the SRS resource set index parameter (e.g., srs-ResourceSetIndex-r18). In an embodiment, the values of the SRS resource set index parameter are 0 and 1 respectively.

In an embodiment, the at least two configured grant physical uplink shared channels fully or partially overlapping in time domain are associated with different values of the SRS resource set index parameter.

In an embodiment, at least one configured grant configuration is used for transmissions of at least two configured grant physical uplink shared channels fully or partially overlapping in time domain.

In an embodiment, two of the at least two configured grant physical uplink shared channels fully or partially overlap in time domain.

In an embodiment, the two configured grant physical uplink shared channels are respectively transmitted based on the first configured grant configuration and the second configured grant configuration.

In an embodiment, since the SRS resource set index parameter in the two configured grant configurations have different values, at least two configured grant physical uplink shared channels fully or partially overlapping in time domain are associated with different values of the SRS resource set index parameter.

In an embodiment, the CG PUSCHs determined by the two selected configured grant configurations are transmitted to two different network devices respectively, and the HARQ process indexes of the two CG PUSCHs are different.

In an embodiment, the time domain resources determined by the two selected configured grant configurations overlap, that is: the time domain resources of CG PUSCH transmission determined by the two configured grant configurations overlap, including the fully overlapping time domain resources and the partially overlapping time domain resources. In an embodiment, the time domain resource of one CG PUSCH transmission is determined by the starting symbol and duration of CG PUSCH transmission. In an embodiment, the CG PUSCH transmission periods determined by the two configured grant configurations are the same, that is, the value of the period parameter (e.g., periodicity) in the configured grant configuration information element is the same.

In this embodiment, through the above solution, it is possible to select the first configured grant configuration and the second configured grant configuration whose time domain resources are fully overlapping; or select the first configured grant configuration and the second configured grant configuration whose time domain resources overlap; or select the associated first configured grant configuration and second configured grant configuration; or select the first configured grant configuration and the second configured grant configuration; or select the first configured grant configuration and the second configured grant configuration respectively from the two configured grant configuration to be added and modified list parameters, to provide a variety of methods for determining at least one configured grant configuration based on radio resource control signaling and/or downlink control information, to applicable to the transmissions of at least two configured grant physical uplink shared channels fully/partially overlapping in time domain, thereby improving the uplink throughput and/or reliability during transmission.

Third Embodiment

Figure 9:
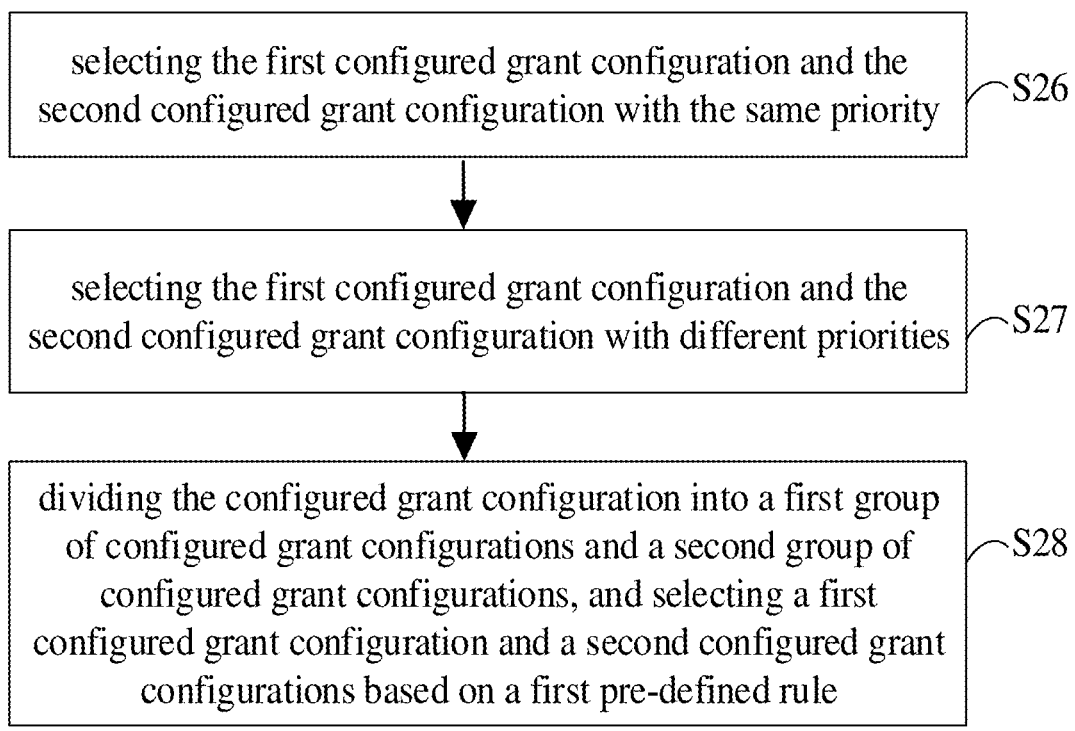
FIG. 9 is a schematic flowchart of a processing method according to a third embodiment.

On the basis of any one of the embodiments of the present application, this embodiment discloses the specific method for determining at least one configured grant configuration based on radio resource control signaling and/or downlink control information. As shown in FIG. 9, FIG. 9 is a schematic flowchart of a processing method according to the third embodiment, showing a method for determining a configured grant configuration, which may also be at least one of the following:

S26, selecting the first configured grant configuration and the second configured grant configuration with the same priority.

For multiple panels based configured grant uplink simultaneous transmission, if the configured grant uplink simultaneous transmission is the simultaneous transmission of two CG PUSCHs, including 2 CG Type 1 PUSCH simultaneous transmissions, 2 CG Type 2 PUSCH simultaneous transmissions, and 1 CG Type 1 PUSCH and 1 CG Type 2 PUSCH simultaneous transmission, the terminal device needs to determine the resources for two CG PUSCH transmissions through two configured grant configurations and priority processing methods to transmit two CG PUSCHs simultaneously. Therefore, if multiple active configured grant configurations have different priorities, a priority processing method needs to be designed to select two configured grant configurations to transmit two CG PUSCHs simultaneously.

In an embodiment, the values of the SRS resource set index parameter in the first configured grant configuration and the second configured grant configuration are different.

In an embodiment, the time domain resources determined by the first configured grant configuration and the second configured grant configuration overlap.

In an embodiment, the at least two configured grant physical uplink shared channels fully or partially overlapping in time domain are associated with different values of the SRS resource set index parameter.

In an embodiment, the SRS resource set index parameter in at least two configured grant configurations have different values.

In an embodiment, the first group of configured grant configurations and the second group of configured grant configurations are respectively associated with the first value and the second value of the CORESET pool index parameter.

In an embodiment, the first group of configured grant configurations and the second group of configured grant configurations are respectively associated with the third value and the fourth value of the SRS resource set index.

In an embodiment, two configured grant configurations with the same priority are selected to transmit two CG PUSCHs simultaneously. In an embodiment, the terminal device selects two configured grant configurations with the same priority from multiple active configured grant configurations to transmit two CG PUSCHs simultaneously.

In an embodiment, the same priority means that the value of the physical layer priority index parameter (e.g., phy-PriorityIndex-r16) in the configured grant configuration information element is the same.

In an embodiment, the SRS resource set index parameter (e.g., srs-ResourceSetIndex-r18) in the two configured grant configurations have different values. In an embodiment, the values of the SRS resource set index parameter are respectively a third value (e.g., 0) and a fourth value (e.g., 1).

In an embodiment, the at least two configured grant physical uplink shared channels fully or partially overlapping in time domain are associated with different values of the SRS resource set index parameter.

In an embodiment, the SRS resource set index parameter in at least two configured grant configurations have different values.

In an embodiment, the CG PUSCHs determined by the two configured grant configurations are respectively transmitted to two different network devices, and the HARQ process indexes of the two CG PUSCHs are different.

In an embodiment, the time domain resources determined by the two configured grant configurations overlap, that is: the time domain resources for CG PUSCH transmission determined by the two configured grant configurations overlap, including the two cases: the time domain resources being fully overlapping or being partially overlapping. In an embodiment, the time domain resource of one CG PUSCH transmission is determined by the starting symbol and duration of CG PUSCH transmission. In an embodiment, the CG PUSCH transmission periods determined by the two configured grant configurations are the same, that is, the value of the period parameter (e.g., periodicity) in the configured grant configuration information element is the same.

S27, selecting the first configured grant configuration and the second configured grant configuration with different priorities.

In an embodiment, two configured grant configurations with different priorities are selected to transmit two CG PUSCHs simultaneously. In an embodiment, the terminal device selects two configured grant configurations with different priorities from multiple active configured grant configurations to transmit two CG PUSCHs simultaneously.

In an embodiment, the priorities are different when the physical layer priority index parameter (e.g., phy-PriorityIndex-r16) in the configured grant configuration information element have different values.

In an embodiment, the SRS resource set index parameter (e.g., srs-ResourceSetIndex-r18) in the two configured grant configurations have different values. In an embodiment, the values of the SRS resource set index parameter are 0 and 1 respectively.

In an embodiment, the CG PUSCHs determined by the two configured grant configurations are respectively transmitted to two different network devices, and the HARQ process indexes of the two CG PUSCHs are different.

In an embodiment, the time domain resources determined by the two selected configured grant configurations overlap, that is: the time domain resources of CG PUSCH transmission determined by the two configured grant configurations overlap, including the two cases: the time domain resources being fully overlapping or being partially overlapping. In an embodiment, the time domain resource of 1 CG PUSCH transmission is determined by the starting symbol and duration of CG PUSCH transmission. In an embodiment, the CG PUSCH transmission periods determined by the two configured grant configurations are the same, that is, the value of the period parameter (e.g., periodicity) in the configured grant configuration information element is the same.

S28, dividing the configured grant configurations into a first group of configured grant configurations and a second group of configured grant configurations, and selecting a first configured grant configuration and a second configured grant configurations based on a first pre-defined rule.

As shown in FIG. 10, FIG. 10 is a first principle schematic diagram according to the third embodiment. As shown in FIG. 10, if there are multiple active configured grant configurations determining CG PUSCH transmissions that overlap in time domain, the configured grant configuration is divided into two groups, perform priority processing on the CG PUSCH transmission determined by each group of configured grant configuration, and select the configured grant configuration with the highest priority in each group, that is: select the two configured grant configurations with the highest priority among the two groups of configured grant configurations to transmit two CG PUSCHs simultaneously.

In an embodiment, the priority is determined based on the value of the physical layer priority index parameter (e.g., phy-PriorityIndex-r16) in the configured grant configuration information element.

In an embodiment, the SRS resource set index parameter (e.g., srs-ResourceSetIndex-r18) in the two configured grant configurations have different values. In an embodiment, the values of the SRS resource set index parameter are 0 and 1 respectively.

In an embodiment, the CG PUSCHs determined by the two configured grant configurations are transmitted to two different network devices respectively, and the HARQ process indexes of the two CG PUSCHs are different.

In an embodiment, dividing the configured grant configuration into the first group of configured grant configuration and the second group of configured grant configuration includes at least one of the following:
 dividing the configured grant configuration into the first group of configured grant configuration and the second group of configured grant configuration based on the value of CORESET pool index parameter;
 dividing the configured grant configuration into the first group of configured grant configuration and the second group of configured grant configuration based on the SRS resource set index.

In an embodiment, the configured grant configurations are divided into two groups based on the value of CORESET pool index parameter (e.g., coresetPoolIndex). The value of CORESET pool index parameter corresponding to the configured grant configurations in each group of configured grant configurations are the same. These two groups of configured grant configurations are respectively associated with different values of the CORESET pool index parameter. For example: the first value is 0 and the second value is 1. In an embodiment, for the configured grant configuration of CG Type 1 PUSCH transmission, the value of the SRS resource set index parameter (e.g., srs-ResourceSetIndex-r18) in the configured grant configuration indicates the SRS (SRS) resource set index associated with the configured grant configuration. The SRS resource set index is associated with a value of CORESET pool index parameter, that is: the CG Type 1 PUSCH transmission determined by the configured grant configuration is associated with a value of CORESET pool index parameter, for example: 0 and 1. For configured grant configuration of CG Type 2 PUSCH transmission, CG Type 2 PUSCH transmission is active and scheduled by valid activation DCI, the DCI associates a value of the CORESET pool index parameter, that is, the CG Type 2 PUSCH transmission determined by the configured grant configuration is associated with a value of CORESET pool index parameter, for example: the first value 0 and the second value 1.

In an embodiment, at least two configured grant physical uplink shared channels fully or partially overlapping in time domain are associated with different values of the CORESET pool index parameter.

In an embodiment, at least one configured grant configuration is used for transmissions of at least two configured grant physical uplink shared channels fully or partially overlapping in time domain.

In an embodiment, the first group of configured grant configurations includes the first configured grant configuration, and the second group of configured grant configurations includes the second configured grant configuration. Since the two groups of configured grant configurations are respectively associated with different values of the CORESET pool index parameter, the first configured grant configuration and the second configured grant configuration are respectively associated with different values of the CORESET pool index parameter.

In an embodiment, two of the at least two configured grant physical uplink shared channels fully or partially overlap in time domain.

In an embodiment, the two configured grant physical uplink shared channels are respectively transmitted based on the first configured grant configuration and the second configured grant configuration.

In an embodiment, since the first configured grant configuration and the second configured grant configuration are respectively associated with different values of the CORESET pool index parameter, the two configured grant physical uplink shared channels are respectively associated with different values of the CORESET pool index parameter.

In an embodiment, the SRS (SRS) resource set index parameter is associated with the CORESET pool index parameter, that is, the CORESET pool index parameter is associated with the SRS resource set index parameter.

In an embodiment, a value of the CORESET pool index parameter is associated with a value of the SRS resource set index parameter.

In an embodiment, the at least two configured grant physical uplink shared channels fully or partially overlapping in time domain are associated to different values of the CORESET pool index parameter, and the association is based on the SRS resource set index parameter in the configured grant configuration.

In an embodiment, the configured grant configurations are divided into two groups based on the SRS (SRS) resource set index. These two groups of configured grant configurations are respectively associated with different values of the SRS resource set index parameter, for example: 0 and 1. In an embodiment, for the configured grant configuration of CG Type 1 PUSCH transmission, the value of the SRS resource set index parameter (e.g., srs-ResourceSetIndex-r18) in the configured grant configuration indicates the SRS resource set index associated with the configured grant configuration. The SRS resource set index associated with the configured grant configuration for CG Type 2 PUSCH transmission is determined by the DCI that activates CG Type 2 PUSCH transmission. In an embodiment, it is determined by the value of the SRS resource set indicator field (e.g., SRS resource set indicator) in the DCI.

In an embodiment, the at least two configured grant physical uplink shared channels fully or partially overlapping in time domain are associated with different values of the SRS resource set index parameter.

In an embodiment, the SRS resource set index parameter in at least two configured grant configurations have different values.

In an embodiment, the selecting the first configured grant configuration and the second configured grant configuration based on the first pre-defined rule includes at least one of the following:

if the first group of configured grant configuration only includes the first configured grant configuration or the second configured grant configuration, directly selecting the first configured grant configuration or the second configured grant configuration;

if the second group of configured grant configuration only includes the first configured grant configuration or the second configured grant configuration, directly selecting the first configured grant configuration or the second configured grant configuration;

if the first group of configured grant configuration at least includes the first configured grant configuration and the second configured grant configuration with different priorities, selecting the first configured grant configuration or the second configured grant configuration with a higher priority;

if the second group of configured grant configuration at least includes the first configured grant configuration and the second configured grant configuration with different priorities, selecting the first configured grant configuration or the second configured grant configuration with a higher priority;

if the first group of configured grant configuration at least includes the first configured grant configuration and the second configured grant configuration with the same priority, selecting the first configured grant configuration or the second configured grant configuration with a smaller value of the configured grant configuration index parameter; and if the second group of configured grant configuration at least includes the first configured grant configuration and the second configured grant configuration with the same priority, selecting the first configured grant configuration or the second configured grant configuration with a smaller value of the configured grant configuration index parameter.

In an embodiment, the CG PUSCH transmissions determined by each group of configured grant configurations are prioritized separately, that is: if there is only one configured grant configuration in a group of configured grant configurations, there is no need to perform priority processing, and one configured grant configuration in this group of configured grant configurations is directly selected. And/or, if there are at least two configured grant configurations with different priorities in a group of configured grant configurations, the terminal device cancels the CG PUSCH transmission determined by the configured grant configuration with a smaller priority, and selects the configured grant configuration with the highest priority. And/or, if there are at least two configured grant configurations with the same priority in a group of configured grant configurations, the terminal device selects the configured grant configuration with a smaller value for the configured grant configuration index parameter (e.g., configuredGrantConfigIndex).

In an embodiment, the time domain resources determined by the two selected configured grant configurations overlap, that is: the time domain resources of CG PUSCH transmission determined by the two configured grant configurations overlap, including the two cases: the time domain resources being fully overlapping or being partially overlapping. In an embodiment, the time domain resource of one CG PUSCH transmission is determined by the starting symbol and duration of CG PUSCH transmission. In an embodiment, the CG PUSCH transmission periods determined by the two configured grant configurations are the same, that is, the value of the period parameter (e.g., periodicity) in the configured grant configuration information element is the same.

In an embodiment, at least two configured grant physical uplink shared channels fully or partially overlapping in time domain are associated with different values of the CORESET pool index parameter.

In an embodiment, the at least two configured grant physical uplink shared channels fully or partially overlapping in time domain are associated with different values of the SRS resource set index parameter.

In an embodiment, the CORESET pool index parameter is associated with the SRS resource set index parameter.

In an embodiment, a value of the CORESET pool index parameter is associated with a value of the SRS resource set index parameter.

In an embodiment, the SRS resource set index parameter in at least two configured grant configurations have different values.

In an embodiment, the at least two configured grant physical uplink shared channels fully or partially overlapping in time domain are associated to different values of the CORESET pool index parameter, and the association is based on the SRS resource set index parameter in the configured grant configuration.

In this embodiment, the above solution includes: selecting the first configured grant configuration and the second configured grant configuration with the same priority; or selecting the first configured grant configuration and the second configured grant configuration with different priorities; or dividing the configured grant configuration into a first group of configured grant configuration and a second group of configured grant configuration; or selecting the first configured grant configuration and the second configured grant configuration based on the first pre-defined rule, which provides a variety of methods for determining at least one configured grant configuration based on radio resource control signaling and/or downlink control information, to applicable to the transmissions of at least two configured grant physical uplink shared channels fully/partially overlapping in time domain, thereby improving the uplink throughput and/or reliability during transmission.

Fourth Embodiment

As shown in FIG. 11, FIG. 11 is a schematic flowchart of a processing method according to the fourth embodiment. The processing method includes the steps:

S3, performing at least one configured grant physical uplink shared channel transmission based on at least one configured grant configuration.

In an embodiment, the configured grant configuration is determined through step S2, Please refer to any of the above embodiments for the specific implementation process, which will not be described again here.

In an embodiment, if the physical uplink control channel transmission overlaps with the at least one configured grant physical uplink shared channel transmission in time domain, the uplink control information transmitted on the physical uplink control channel is multiplexed into the at least one configured grant physical uplink shared channel transmission.

For the multiple panels based uplink simultaneous transmission, if simultaneous transmission of PUSCH and Physical Uplink Control Channel (PUCCH) is not supported, and the configured grant uplink simultaneous transmission is two CG PUSCHs simultaneous transmission, including 2 CG Type 1 PUSCHs simultaneous transmission, 2 CG Type 2 PUSCHs simultaneous transmission, and 1 CG Type 1 PUSCH and 1 CG Type 2 PUSCH simultaneous transmission. And, there are other PUCCH transmissions that overlap with these two CG PUSCHs in time domain. For such scenarios, a priority processing method needs to be designed to transmit two CG PUSCHs simultaneously.

In an embodiment, the multiplexing the uplink control information transmitted on the physical uplink control channel into the at least one configured grant physical uplink shared channel transmission includes at least one of the following:
  dividing uplink transmission into a first group of uplink transmission and a second group of uplink transmission, and performing at least one configured grant physical uplink shared channel transmission based on a second pre-defined rule;
  selecting the configured grant configuration based on the value of CORESET pool index parameter, and multiplexing the uplink control information into the configured grant physical uplink shared channel transmission with the same value of CORESET pool index parameter;
  selecting the configured grant configuration based on the SRS resource set index, and multiplexing the uplink control information into the configured grant physical uplink shared channel transmission with the same SRS resource set index; and
  selecting the configured grant configuration based on transmission configuration indication state, and multiplexing the uplink control information into the configured grant physical uplink shared channel transmission with the same transmission configuration indication state.

In an embodiment, the processing method further includes canceling physical uplink control channel transmission.

In an embodiment, the values of the SRS resource set index parameter in the first configured grant configuration and the second configured grant configuration are different.

In an embodiment, the corresponding value of CORESET pool index parameter and/or SRS resource set index in the first group of uplink transmission are the same.

In an embodiment, the corresponding value of CORESET pool index parameter and/or SRS resource set index in the second group of uplink transmission are the same.

In an embodiment, the first group of uplink transmission and the second group of uplink transmission are respectively associated with the first value and the second value of the CORESET pool index parameter.

In an embodiment, the first group of uplink transmission and the second group of uplink transmission are respectively associated with the third value and the fourth value of the SRS resource set index.

In an embodiment, dividing the uplink transmission into the first group of uplink transmission and the second group of uplink transmission includes: dividing the uplink transmission into a first group of uplink transmission and a second group of uplink transmission based on the value of CORESET pool index parameter, and/or, dividing the uplink transmission into a first group of uplink transmission and a second group of uplink transmission based on the SRS resource set index.

In an embodiment, the performing at least one configured grant physical uplink shared channel transmission based on the second pre-defined rule includes at least one of the following:
  if the priority of the physical uplink control channel transmission in the first group of uplink transmission is higher than the priority of the first configured grant configuration or the second configured grant configuration in the first group of uplink transmission, multiplexing the uplink control information into the corresponding first configured grant configuration or second configured grant configuration;
  if the priority of the physical uplink control channel transmission in the second group of uplink transmission is higher than the priority of the first configured grant configuration or the second configured grant configuration in the second group of uplink transmission, multiplexing the uplink control information into the corresponding first configured grant configuration or the second configured grant configuration.

In an embodiment, the canceling physical uplink control channel transmission includes at least one of the following:
  if the priority of the physical uplink control channel transmission in the first group of uplink transmission is lower than the priority of the first configured grant configuration or the second configured grant configuration in the first group of uplink transmission, canceling the physical uplink control channel transmission;
  if the priority of the physical uplink control channel transmission in the second group of uplink transmission is lower than the priority of the first configured grant configuration or the second configured grant configuration in the second group of uplink transmission, canceling the physical uplink control channel transmission;
  canceling the physical uplink control channel transmission in the first group of uplink transmission;
  canceling the physical uplink control channel transmission in the second group of uplink transmission.

In an embodiment, if the configured grant uplink simultaneous transmission is the simultaneous transmission of two CG PUSCHs, and there is PUCCH transmission with different priorities that overlap with the two CG PUSCHs in time domain, a priority processing method needs to be designed to perform the simultaneous transmission of the two CG PUSCHs.

In an embodiment, if there are two CG PUSCH transmissions determined by the active configured grant configuration that overlap in time domain with one PUCCH transmission, these uplink transmissions (i.e., CG PUSCH or PUCCH transmissions) are divided into two groups, and each group of uplink transmissions is processed based on the second pre-defined rule or PUCCH transmission is canceled, so that two CG PUSCH transmissions are transmitted simultaneously.

In an embodiment, the priority of CG PUSCH transmission determined by the configured grant configuration is determined based on the value of the physical layer priority index parameter (e.g., phy-PriorityIndex) in the configured grant configuration information element; the priority of PUCCH transmission is determined from at least one of the following based on the type of uplink control information (UCI) transmitted in PUCCH: the value of the priority indicator field (e.g., Priority indicator) in DCI, the value of the HARQ codebook index parameter (e.g., harq-CodebookID) in the SPS configuration information element (e.g., SPS-Config), the value of the physical layer priority index parameter (e.g., phy-PriorityIndex) in the scheduling request resource configuration information element (e.g., SchedulingRequestResourceConfig).

In an embodiment, the SRS resource set index parameter (e.g., srs-ResourceSetIndex-r18) in the two configured grant configurations have different values. In an embodiment, the values of the SRS resource set index parameter are 0 and 1 respectively.

In an embodiment, the two CG PUSCHs determined by the configured grant configuration are transmitted to two different network devices respectively, and the HARQ process indexes of the two CG PUSCHs are different.

In an embodiment, uplink transmission (i.e., CG PUSCH and/or PUCCH transmission) is divided into two groups, including at least one of the following methods:

Method 1: uplink transmission is divided into two groups based on the value of CORESET pool index parameter (e.g., coresetPoolIndex). The value of CORESET pool index parameter corresponding to the uplink transmission (i.e., CG PUSCH and/or PUCCH transmission) in each group of uplink transmission (i.e., CG PUSCH and/or PUCCH transmission) is the same, and these two groups of uplink transmissions are respectively associated with different values of the CORESET pool index parameter, for example: 0 and 1.

In an embodiment, for the configured grant configuration of CG Type 1 PUSCH transmission, the value of the SRS resource set index parameter (e.g., srs-ResourceSetIndex-r18) in the configured grant configuration indicates the SRS resource set index associated with the configured grant configuration. The SRS resource set index is associated with a value of CORESET pool index parameter, that is: the CG Type 1 PUSCH transmission determined by the configured grant configuration is associated with a value of CORESET pool index parameter, e.g., 0 and 1.

In an embodiment, for the configured grant configuration of CG Type 2 PUSCH transmission, CG Type 2 PUSCH transmission is active and scheduled by the valid activation DCI. The DCI is associated with a value of CORESET pool index parameter, that is, the CG Type 2 PUSCH transmission determined by the configured grant configuration is associated with a value of CORESET pool index parameter, e.g., 0 and 1.

In an embodiment, the PUCCH resource corresponding to the PUCCH transmission is associated with a transmission configuration indication (TCI) state (e.g., joint TCI state or uplink TCI state). The TCI state corresponds to a value of CORESET pool index parameter, e.g., 0 and 1.

Method 2: the uplink transmission is divided into two groups based on the SRS resource set index. These two groups of uplink transmissions (i.e., CG PUSCH and/or PUCCH transmission) are respectively associated with different values of the SRS resource set index parameter, e.g., 0 and 1.

In an embodiment, for the configured grant configuration for CG Type 1 PUSCH transmission, the value of the SRS resource set index parameter (e.g., srs-ResourceSetIndex-r18) included in the configured grant configuration indicates the SRS resource set index associated with the configured grant configuration. The SRS resource set index associated with the configured grant configuration for CG Type 2 PUSCH transmission is determined by the DCI that activates CG Type 2 PUSCH transmission. In an embodiment, it is determined by the value of the SRS resource set indicator field (e.g., SRS resource set indicator) in the DCI. In an embodiment, the SRS resource set index associated with PUCCH transmission is determined by the PUCCH resource. In an embodiment, the SRS resource set index associated with PUCCH transmission is determined by the value of the SRS resource set indicator field (e.g., SRS resource set indicator) in the DCI that schedules the PUCCH transmission.

In an embodiment, for a group of uplink transmissions including PUCCH transmissions, if the priority of the PUCCH transmission is higher than the priority of the CG PUSCH transmission in this group of uplink transmissions, the UCI in the PUCCH transmission is multiplexed to the CG PUSCH in this group of uplink transmissions, and simultaneous transmission is performed based on the two CG PUSCHs in these two groups of uplink transmissions.

In an embodiment, for a group of uplink transmissions including PUCCH transmission, this PUCCH transmission is canceled, and simultaneous transmission is performed based on two CG PUSCHs in these two groups of uplink transmissions.

In an embodiment, for a group of uplink transmissions including PUCCH transmissions, if the priority of PUCCH transmission is lower than the priority of CG PUSCH transmission in this group of uplink transmissions, this PUCCH transmission is canceled and simultaneous transmission is performed based on the two CG PUSCHs in these two groups of uplink transmissions.

In an embodiment, the time domain resources determined by the two selected configured grant configurations overlap, that is: the time domain resources of CG PUSCH transmission determined by the two configured grant configurations overlap, including the two cases: the fully overlapping time domain resources and the partially overlapping time domain resources. In an embodiment, the time domain resource of one CG PUSCH transmission is determined by the starting symbol and duration of CG PUSCH transmission. In an embodiment, the CG PUSCH transmission periods determined by the two configured grant configurations are the same, that is, the value of the period parameter (e.g., periodicity) in the configured grant configuration information element is the same.

In an embodiment, if the configured grant uplink simultaneous transmission is the simultaneous transmission of two CG PUSCHs, and there is PUCCH transmission with the same priority that overlap with these two CG PUSCHs in time domain, a UCI multiplexing method needs to be designed for simultaneous transmission of two CG PUSCHs.

In an embodiment, a CG PUSCH is selected based on the SRS resource set index, and the UCI in PUCCH transmission is multiplexed to the CG PUSCH with the same SRS resource set index.

In an embodiment, if the joint HARQ-ACK feedback mode is configured, that is: the ACK/NACK feedback mode parameter (e.g., ackNackFeedbackMode) is set to 'joint', or, if the UCI does not contain HARQ-ACK, and the starting symbols of the two CG PUSCHs are the same, then the UCI in the PUCCH transmission is multiplexed to the CG PUSCH transmission with an SRS resource set index of 0.

In an embodiment, if the separated HARQ-ACK feedback mode is configured, that is: the ACK/NACK feedback mode parameter is set to 'separate', then the UCI in the PUCCH transmission is multiplexed to the CG PUSCH transmission that has the same SRS resource set index as the PUCCH transmission.

In an embodiment, for CG Type 1 PUSCH, the value of the SRS resource set index parameter (e.g., srs-ResourceSetIndex-r18) in the configured grant configuration for CG Type 1 PUSCH transmission indicates the SRS resource set index associated with the configured grant configuration.

In an embodiment, for CG Type 2 PUSCH, the SRS resource set index associated with CG Type 2 PUSCH transmission is determined by the DCI that activates CG Type 2 PUSCH transmission. In an embodiment, it is determined by the value of the SRS resource set indicator field (e.g., SRS resource set indicator) in the DCI. In an embodiment, the SRS resource set index associated with PUCCH transmission is determined by the PUCCH resource. In an embodiment, the SRS resource set index associated with PUCCH transmission is determined by the value of the SRS resource set indicator field (e.g., SRS resource set indicator) in the DCI that schedules the PUCCH transmission.

In an embodiment, the CG PUSCH is selected based on the value of CORESET pool index parameter (e.g., coreset-PoolIndex), and the UCI in the PUCCH transmission is multiplexed to the CG PUSCH with the same value of CORESET pool index parameter.

In an embodiment, if the joint HARQ-ACK feedback mode is configured, that is: the ACK/NACK feedback mode parameter (e.g., ackNackFeedbackMode) parameter is set to 'joint', or, the UCI does not contain HARQ-ACK, and the starting symbols of the two CG PUSCHs are the same, then the UCI in the PUCCH transmission is multiplexed to the CG PUSCH transmission whose value of CORESET pool index parameter is 0.

In an embodiment, if the separated HARQ-ACK feedback mode is configured, that is: the ACK/NACK feedback mode parameter is set to 'separate', then the UCI in the PUCCH transmission is multiplexed into the CG PUSCH transmission that has the same value of CORESET pool index parameter as the PUCCH transmission.

In an embodiment, for CG Type 1 PUSCH, the value of the SRS resource set index parameter (e.g., srs-ResourceSetIndex-r18) in the configured grant configuration for CG Type 1 PUSCH transmission indicates the SRS resource set index associated with the configured grant configuration. The SRS resource set index is associated with a value of CORESET pool index parameter, that is: the CG Type 1 PUSCH transmission determined by the configured grant configuration is associated with a value of CORESET pool index parameter, for example: 0 and 1.

In an embodiment, for CG Type 2 PUSCH, CG Type 2 PUSCH transmission is active and scheduled by a valid activation DCI. This DCI is associated with a value of CORESET pool index parameter, that is: the CG Type 2 PUSCH transmission determined by the configured grant configuration is associated with a value of CORESET pool index parameter, for example: 0 and 1. The PUCCH resource corresponding to PUCCH transmission is associated with a TCI state (e.g., joint TCI state or uplink TCI state). This TCI state corresponds to a value of CORESET pool index parameter, for example: 0 and 1.

In an embodiment, a CG PUSCH is selected based on the TCI state (e.g., joint TCI state or uplink TCI state), and the UCI in PUCCH transmission is multiplexed to the CG PUSCH with the same TCI state. In an embodiment, the TCI state for PUCCH transmission is determined by the TCI state indication parameter in the PUCCH resource and the transmission configuration indication field (e.g., Transmission configuration indication) in the DCI. The TCI state for CG PUCCH transmission is determined by the TCI state indication parameter in the configured grant configuration and the transmission configuration indication field in DCI.

In this embodiment, through the above solution, at least one configured grant physical uplink shared channel transmission is performed based on at least one configured grant configuration, to provide a method that is applicable to the transmissions of at least two configured grant physical uplink shared channels fully/partially overlapping in time domain, thereby improving uplink throughput and/or reliability during transmission.

Fifth Embodiment

As shown in FIG. 12, FIG. 12 is a schematic flowchart of a processing method according to the fifth embodiment. The method in the embodiment of the present application can be applied to a network device (such as a base station), and includes the steps:

S1, sending radio resource control signaling and/or downlink control information, so that the terminal device determines at least one configured grant configuration based on the radio resource control signaling and/or downlink control information.

In an embodiment, the network device sends radio resource control signaling and/or downlink control information to the terminal device.

In an embodiment, the radio resource control signaling includes at least one of a configured grant configuration information element, a period parameter, a time domain allocation parameter, an SRS resource set index parameter, an associated configured grant configuration index parameter, a configured grant configuration to be added and modified list parameter, a physical layer priority index parameter and a CORESET pool index parameter.

In an embodiment, the downlink control information includes at least one of a priority indication field, a transmission configuration indication field and an SRS resource set indicator field;

In an embodiment, the at least one configured grant configuration includes a first configured grant configuration and/or a second configured grant configuration.

In an embodiment, the at least one configured grant configuration is configured to transmit at least two fully overlapping or partially overlapping configured grant physical uplink shared channels in time domain.

In an embodiment, the at least one configured grant configuration includes the SRS resource set index parameter.

In an embodiment, the at least two configured grant physical uplink shared channels fully or partially overlapping in time domain are associated with different values of the CORESET pool index parameter.

In an embodiment, the at least two configured grant physical uplink shared channels fully or partially overlapping in time domain are associated with different values of the SRS resource set index parameter.

In an embodiment, the CORESET pool index parameter is associated with the SRS resource set index parameter.

In an embodiment, a value of the CORESET pool index parameter is associated with a value of the SRS resource set index parameter.

In an embodiment, values of the SRS resource set index parameter in at least two configured grant configurations are different.

In an embodiment, the at least two configured grant physical uplink shared channels fully or partially overlapping in time domain are associated to different values of the CORESET pool index parameter, and the association is based on the SRS resource set index parameter in the configured grant configuration.

In an embodiment, the method for determining the configured grant configuration includes at least one of the following:

selecting, by the terminal device, a first configured grant configuration and a second configured grant configuration whose time domain resources are fully overlapping;

selecting, by the terminal device, the first configured grant configuration and the second configured grant configuration whose time domain resources overlap;

adding an associated configured grant configuration index parameter, and selecting, by the terminal device, the associated first configured grant configuration and second configured grant configuration;

adding one configured grant configuration to be added and modified list parameter, and selecting, by the terminal device, the first configured grant configuration and the second configured grant configuration from the two configured grant configuration to be added and modified list parameters respectively;

selecting, by the terminal device, the first configured grant configuration and the second configured grant configuration with the same priority;

selecting, by the terminal device, the first configured grant configuration and the second configured grant configuration with different priorities; and dividing, by the terminal device, the configured grant configuration into a first group of configured grant configuration and a second group of configured grant configuration, and selecting the first configured grant configuration and the second configured grant configuration based on a first pre-defined rule.

In an embodiment, when the configured grant configuration information element (e.g., ConfiguredGrantConfig) received by the terminal device contains the radio resource control configured uplink grant information element (e.g., rrc-ConfiguredUplinkGrant), CG Type 1 PUSCH transmission is configured semi-statically, and CG Type 1 PUSCH transmission can be performed without detecting the uplink grant in the downlink control information; and/or, when the configured grant configuration information element received by the terminal device does not contain the radio resource control configured uplink grant information element, the CG Type 2 PUSCH transmission is semi-persistently scheduled by an UL grant in a valid activation DCI. In the active BWP of a serving cell, more than one configured grant configuration for CG Type 1 PUSCH and/or CG Type 2 PUSCH transmission can be active simultaneously.

In an embodiment, the network device indicates the configured grant configuration through the configured grant configuration information element, the terminal device can determine a CG PUSCH transmission resource according to a configured grant configuration and/or the uplink grant in the DCI, e.g., time domain and frequency domain resources. For multiple panels based configured grant uplink simultaneous transmission, if the configured grant uplink simultaneous transmission is the simultaneous transmission of two CG Type 1 PUSCHs, the terminal device needs to determine the resources for the two CG PUSCH transmissions through the two configured grant configurations to achieve the simultaneous transmission of the two CG PUSCHs. Therefore, two configured grant configurations need to be configured for two CG PUSCHs transmitted simultaneously to determine the resources for two CG PUSCHs transmitted simultaneously.

In an embodiment, the terminal device selects two configured grant configurations with the same time domain resources to transmit two CG PUSCHs simultaneously. In an embodiment, the time domain resource of one CG PUSCH transmission is determined by the starting symbol and duration of the CG PUSCH transmission.

In an embodiment, the time domain resources determined by the two configured grant configurations can be the same based on the same value of at least one of the following parameters: the period parameter (e.g., periodicity) in the configured grant configuration information element, the time domain allocation parameter (e.g., timeDomainAllocation) in the radio resource control configured uplink grant information element in the configured grant configuration information element, the time domain offset parameter (e.g., timeDomainOffset) in the radio resource control configured uplink grant information element in the configured grant configuration information element and the time reference system frame number parameter (e.g., timeReferenceSFN) in the radio resource control configured uplink grant information element in the configured grant configuration information element, etc.

In an embodiment, the terminal device selects two configured grant configurations whose time domain resources overlap to transmit two CG PUSCHs simultaneously. In an embodiment, the time domain resources for one CG PUSCH transmission are determined by the starting symbol and duration of the CG PUSCH transmission.

In an embodiment, the terminal device selects two associated configured grant configurations to transmit two CG PUSCHs simultaneously.

In an embodiment, the terminal device selects two configured grant configurations to transmit two CG PUSCHs simultaneously.

In an embodiment, the terminal device selects one configured grant configuration from two configured grant configuration to be added and modified list parameters (e.g., configuredGrantConfigToAddModList) to transmit two CG PUSCHs simultaneously.

In this embodiment, through the above solution, by determining at least one configured grant configuration based on radio resource control signaling and/or downlink control information, a method for determining more than one configured grant configuration is provided, to applicable to the transmissions of at least two configured grant physical uplink shared channels fully/partially overlapping in time domain, thereby improving the uplink throughput and/or reliability during transmission.

Sixth Embodiment

Figure 13:
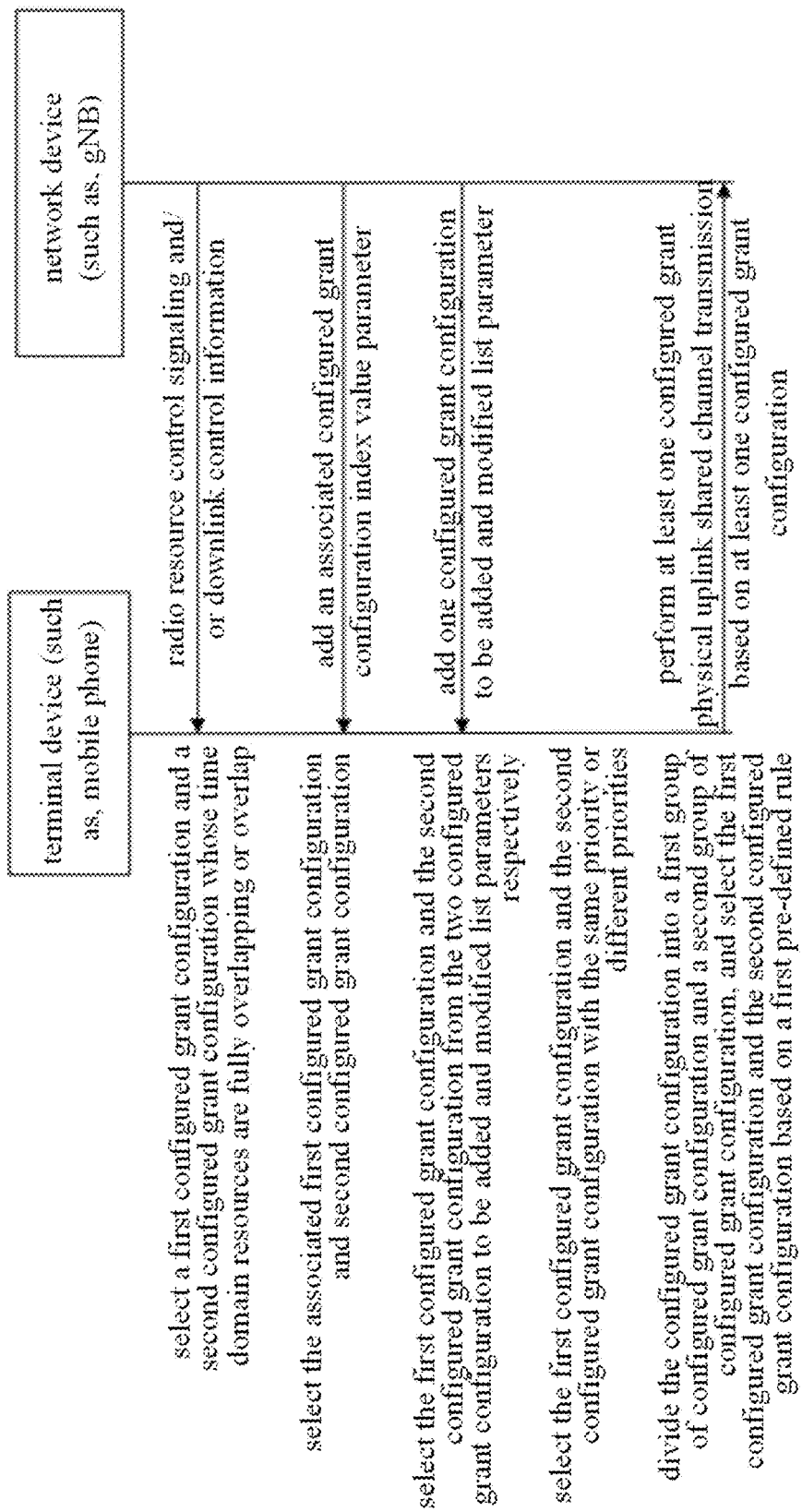
FIG. 13 is an interactive schematic diagram according to a sixth embodiment.

As shown in FIG. 13, FIG. 13 is an interaction schematic diagram according to the sixth embodiment.

In an embodiment of the present application, the network device (such as a base station) sends radio resource control signaling and/or downlink control information to the terminal device (such as a mobile phone), so that the terminal device determines at least one configured grant configuration based on radio resource control signaling and/or downlink control information.

In an embodiment, the terminal device selects two configured grant configurations to determine the resources for two CG PUSCH transmissions, thereby transmitting two CG PUSCHs simultaneously. In an embodiment, the values of the SRS resource set index parameter in the two configured grant configurations are different.

In an embodiment, the terminal device selects the first configured grant configuration and the second configured grant configuration whose time domain resources are fully overlapping.

In an embodiment, the same time domain resources means that at least one of the following is the same: the starting symbol of CG PUSCH transmission, the starting symbol S which is determined from the time domain resource allocation table by the row index determined by the value of the time domain allocation parameter, the duration which is determined from the time domain resource allocation table by the row index determined by the value of the time domain allocation parameter, the period of CG PUSCH transmission, etc.

In an embodiment, it is possible to use any of the following methods to make the time domain resources determined by the two configured grant configurations the same:

Method 1: the time domain resources determined by the two configured grant configurations are the same based on the same value of at least one of the period parameter, time domain allocation parameter, time domain offset parameter, and time reference system frame number parameter in the configured grant configuration information element.

Method 2: the time domain resources (e.g., the starting symbol of CG PUSCH transmission) determined by the two configured grant configurations are the same based on the value of at least one of the period parameter, time domain allocation parameter, time domain offset parameter, and time reference system frame number parameter in the configured grant configuration information element.

In an embodiment, the terminal device selects the first configured grant configuration and the second configured grant configuration whose time domain resources overlap.

In an embodiment, two configured grant configurations whose time domain resources overlap are selected to transmit two CG PUSCHs simultaneously. In an embodiment, the time domain resources for one CG PUSCH transmission are determined by the starting symbol and duration of the CG PUSCH transmission.

In an embodiment, the time domain resources determined by the two selected configured grant configurations overlap, that is: the time domain resources determined by the two configured grant configurations overlap. The overlap of time domain resources for CG PUSCH transmission determined by the two configured grant configurations includes two cases: the time domain resources being fully overlapping and the time domain resources being partially overlapping.

In an embodiment, the CG PUSCH transmission periods determined by the two configured grant configurations are the same, that is, the value of the period parameter (e.g., periodicity) in the configured grant configuration information element is the same.

In an embodiment, the network device adds an associated configured grant configuration index parameter, and the terminal device selects the associated first configured grant configuration and second configured grant configuration.

In an embodiment, two associated configured grant configurations are selected to transmit two CG PUSCHs simultaneously.

In an embodiment, a method for associating two configured grant configurations: adding the associated configured grant configuration index parameter in the configured grant configuration information element or the radio resource control configured uplink grant information element in the configured grant configuration information element to indicate the configured grant configuration index of the associated configured grant configuration. The associated configured grant configuration is obtained according to the configured grant configuration index, thereby obtaining two configured grant configurations.

In an embodiment, the time domain resources determined by the two selected configured grant configurations overlap, that is: the time domain resources for CG PUSCH transmission determined by the two configured grant configurations overlap, including the two cases: the time domain resources being fully overlapping and the time domain resources being partially overlapping.

In an embodiment, two configured grant configurations are selected to transmit two CG PUSCH simultaneously. In an embodiment, the time domain resources determined by the two selected configured grant configurations overlap, that is, the time domain resources for CG PUSCH transmission determined by the two configured grant configurations overlap, including the two cases: the time domain resources being fully overlapping and the time domain resources being partially overlapping.

In an embodiment, the network device adds one configured grant configuration to be added and modified list parameter, and the terminal device selects the first configured grant configuration and the second configured grant configuration from the two configured grant configuration to be added and modified list parameters respectively.

In an embodiment, two configured grant configurations are selected from the two configured grant configuration to be added and modified list parameters for simultaneous transmission of two CG PUSCHs.

In an embodiment, the network device adds one configured grant configuration to be added and modified list parameter in the uplink dedicated bandwidth part information element.

In an embodiment, the time domain resources determined by the two selected configured grant configurations overlap, that is, the time domain resources for CG PUSCH transmission determined by the two configured grant configurations overlap, including the two cases: the time domain resources being fully overlapping and the time domain resources being partially overlapping.

In an embodiment, for multiple active configured grant configurations with different priorities, a priority processing method needs to be designed to select two configured grant configurations for simultaneous transmission of two CG PUSCHs. In an embodiment, the values of the SRS resource set index parameter in these two configured grant configurations are different.

In an embodiment, the terminal device selects the first configured grant configuration and the second configured grant configuration with the same priority.

In an embodiment, two configured grant configurations with the same priority are selected to transmit two CG PUSCHs simultaneously.

In an embodiment, the same priority means that the value of the physical layer priority index parameter in the configured grant configuration information element is the same.

In an embodiment, the terminal device selects the first configured grant configuration and the second configured grant configuration with different priorities.

In an embodiment, two configured grant configurations with different priorities are selected to transmit two CG PUSCHs simultaneously. In an embodiment, the different priorities are different values of the physical layer priority index parameter in the configured grant configuration information element.

In an embodiment, the terminal device divides the configured grant configuration into a first group of configured grant configuration and a second group of configured grant configuration, and selects the first configured grant configuration and the second configured grant configuration based on the first pre-defined rule.

In an embodiment, the two configured grant configurations with the highest priority among the two groups of configured grant configurations are selected for simultaneous transmission of two CG PUSCHs.

In an embodiment, the terminal device divides the configured grant configuration into a first group of configured grant configuration and a second group of configured grant configuration, including at least one of the following:
- the terminal device divides the configured grant configuration into a first group of configured grant configuration and a second group of configured grant configuration based on the value of CORESET pool index parameter;
- the terminal device divides the configured grant configuration into a first group of configured grant configuration and a second group of configured grant configuration based on the SRS resource set index.

In an embodiment, dividing the configured grant configuration into two groups includes at least one of the following:

Method 1: dividing the configured grant configuration into two groups based on the value of CORESET pool index parameter. These two groups of configured grant configurations are respectively associated with the values 0 and 1 of the CORESET pool index parameter.

Method 2: dividing the configured grant configuration into two groups based on the SRS resource set index. These two groups of configured grant configurations are respectively associated with the values 0 and 1 of the SRS resource set index.

In an embodiment, the CG PUSCH transmission determined by each group of configured grant configurations is processed based on the second pre-defined rule or the PUCCH transmission is canceled, including at least one of the following methods:
- Method 1: if there is only one configured grant configuration in a group of configured grant configurations, directly select one configured grant configuration in this group of configured grant configurations;
- Method 2: if there are at least two configured grant configurations with different priorities in a group of configured grant configurations, the terminal device cancels the CG PUSCH transmission determined by the configured grant configuration with a smaller priority and selects the configured grant configuration with the highest priority.

In an embodiment, the terminal device divides the uplink transmission (i.e., CG PUSCH or PUCCH transmission) into two groups, and performs priority processing on each group of uplink transmission respectively, thereby performing two CG PUSCH simultaneous transmissions.

In an embodiment, uplink transmission (i.e., CG PUSCH or PUCCH transmission) is divided into two groups, including any of the following:

Method 1: dividing uplink transmission into two groups based on the value of CORESET pool index parameter. The value of the CORESET pool index parameter corresponding to the uplink transmission (i.e., CG PUSCH and/or PUCCH transmission) in each group of uplink transmission (i.e., CG PUSCH or PUCCH transmission) is the same.

Method 2: dividing the uplink transmission into two groups based on the SRS resource set index. The SRS resource set index corresponding to the uplink transmission (i.e., CG PUSCH and/or PUCCH transmission) in each group of uplink transmission (i.e., CG PUSCH or PUCCH transmission) is the same.

In an embodiment, performing at least one configured grant physical uplink shared channel transmission based on the second pre-defined rule includes:

for a group of uplink transmissions including PUCCH transmission, if the priority of PUCCH transmission is higher than the priority of CG PUSCH transmission in this group of uplink transmissions, multiplexing the UCI in the PUCCH transmission to the CG PUSCH in this group of uplink transmissions, and perform simultaneous transmission based on the two CG PUSCHs in these two groups of uplink transmissions.

In an embodiment, canceling the PUCCH transmission includes:

For a group of uplink transmissions including PUCCH transmission, if the priority of PUCCH transmission is lower than the priority of CG PUSCH transmission in this group of uplink transmissions, canceling this PUCCH transmission and performing simultaneous transmission based on the two CG PUSCHs in these two groups of uplink transmissions.

For a group of uplink transmissions including PUCCH transmission, canceling this PUCCH transmission, and performing simultaneous transmission based on the two CG PUSCHs in these two groups of uplink transmissions.

In an embodiment, the terminal device performs at least one configured grant physical uplink shared channel transmission based on at least one configured grant configuration.

In an embodiment, the CG PUSCH is selected based on the SRS resource set index, and the UCI in PUCCH transmission is multiplexed to the CG PUSCH with the same SRS resource set index.

In an embodiment, if the joint HARQ-ACK feedback mode is configured, or the UCI does not contain HARQ-ACK, the UCI in the PUCCH transmission is multiplexed to the CG PUSCH transmission with an SRS resource set index of 0.

In an embodiment, if the separated HARQ-ACK feedback mode is configured, the UCI in the PUCCH transmission is multiplexed to the CG PUSCH transmission that has the same SRS resource set index as the PUCCH transmission.

In an embodiment, the CG PUSCH is selected based on the control resource set pool index, and the UCI in the PUCCH transmission is multiplexed to the CG PUSCH with the same control resource set pool index.

In an embodiment, if the joint HARQ-ACK feedback mode is configured, or the UCI does not contain HARQ-ACK, the UCI in the PUCCH transmission is multiplexed to the CG PUSCH transmission with a value of CORESET pool index parameter of 0.

In an embodiment, if the separate HARQ-ACK feedback mode is configured, the UCI in the PUCCH transmission is multiplexed to the CG PUSCH transmission that has the same value of CORESET pool index parameter as the PUCCH transmission.

In an embodiment, the CG PUSCH is selected based on the TCI state, and the UCI in the PUCCH transmission is multiplexed to the CG PUSCH with the same TCI state.

In this embodiment, through the above solution, the network device sends radio resource control signaling and/or downlink control information to the terminal device, so that the terminal device determines at least one configured grant configuration based on the radio resource control signaling and/or downlink control information, a method for determining at least one configured grant configuration based on radio resource control signaling and/or downlink control information is provided, to applicable to the transmissions of at least two configured grant physical uplink shared channels fully/partially overlapping in time domain, thereby improving the uplink throughput and/or reliability during transmission.

Figure 14:
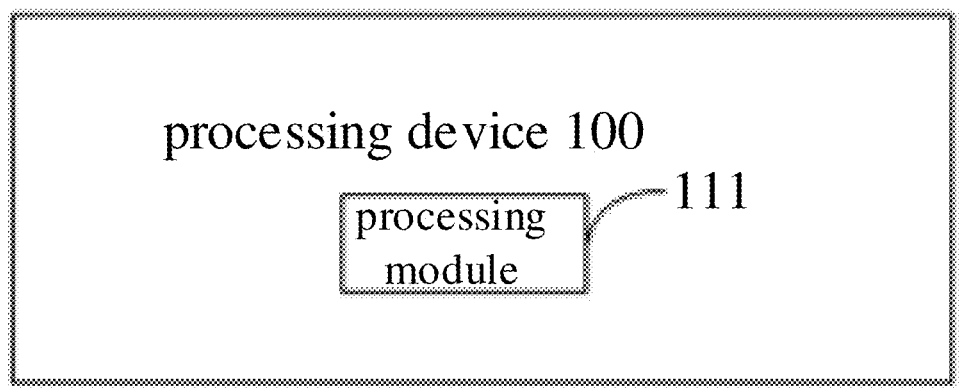
FIG. 14 is a first schematic structural diagram of a processing device according to an embodiment of the present application.

As shown in FIG. 14, FIG. 14 is a first schematic structural diagram of a processing device according to an embodiment of the present application. This device can be mounted on or be the terminal device in the above method embodiment. The processing device shown in FIG. 14 can perform some or all of the functions in the method embodiments described in the above embodiments. As shown in FIG. 14, the processing device 110 includes:

a processing module 111, configured to determine at least one configured grant configuration based on radio resource control signaling and/or downlink control information.

In an embodiment, the method for determining the configured grant configuration includes at least one of the following:

selecting a first configured grant configuration and a second configured grant configuration whose time domain resources are fully overlapping;

selecting the first configured grant configuration and the second configured grant configuration whose time domain resources overlap;

selecting the associated first configured grant configuration and second configured grant configuration;

selecting the first configured grant configuration and the second configured grant configuration from the two configured grant configuration to be added and modified list parameters respectively;

selecting the first configured grant configuration and the second configured grant configuration with the same priority;

selecting the first configured grant configuration and the second configured grant configuration with different priorities; and dividing the configured grant configuration into a first group of configured grant configuration and a second group of configured grant configuration, and selecting the first configured grant configuration and the second configured grant configuration based on a first pre-defined rule.

In an embodiment, the dividing the configured grant configuration into the first group of configured grant configuration and the second group of configured grant configuration includes at least one of the following:

dividing the configured grant configuration into the first group of configured grant configuration and the second group of configured grant configuration based on a value of CORESET pool index parameter; and dividing the configured grant configuration into the first group of configured grant configuration and the second group of configured grant configuration based on an SRS resource set index.

In an embodiment, the selecting the first configured grant configuration and the second configured grant configuration based on the first pre-defined rule includes at least one of the following:

if the first group of configured grant configuration only includes the first configured grant configuration or the second configured grant configuration, directly selecting the first configured grant configuration or the second configured grant configuration;

if the second group of configured grant configuration only includes the first configured grant configuration or the second configured grant configuration, directly selecting the first configured grant configuration or the second configured grant configuration;

if the first group of configured grant configuration at least includes the first configured grant configuration and the second configured grant configuration with different priorities, selecting the first configured grant configuration or the second configured grant configuration with a higher priority;

if the second group of configured grant configuration at least includes the first configured grant configuration and the second configured grant configuration with different priorities, selecting the first configured grant configuration or the second configured grant configuration with a higher priority;

if the first group of configured grant configuration at least includes the first configured grant configuration and the second configured grant configuration with the same priority, selecting the first configured grant configuration or the second configured grant configuration with a smaller value of a configured grant configuration index parameter; and if the second group of configured grant configuration at least includes the first configured grant configuration and the second configured grant configuration with the same priority, selecting the first configured grant configuration or the second configured grant configuration with a smaller value of the configured grant configuration index parameter.

In an embodiment, the device further includes at least one of the following:

values of the SRS resource set index parameter in the first configured grant configuration and the second configured grant configuration are different;

time domain resources determined by the first configured grant configuration and the second configured grant configuration overlap;

the first group of configured grant configuration and the second group of configured grant configurations are respectively associated with a first value and a second value of a CORESET pool index parameter; and the first group of configured grant configuration and the second group of configured grant configuration are respectively associated with a third value and a fourth value of an SRS resource set index.

In an embodiment, performing at least one configured grant physical uplink shared channel transmission based on at least one configured grant configuration includes:

if the physical uplink control channel transmission overlaps with the at least one configured grant physical uplink shared channel transmission in time domain, multiplexing uplink control information transmitted on a physical uplink control channel into the at least one configured grant physical uplink shared channel transmission.

In an embodiment, the multiplexing the uplink control information transmitted on the physical uplink control channel into the at least one configured grant physical uplink shared channel transmission includes at least one of the following:

dividing uplink transmission into a first group of uplink transmission and a second group of uplink transmission, and performing at least one configured grant physical uplink shared channel transmission based on a second pre-defined rule;

selecting the configured grant configuration based on the value of CORESET pool index parameter, and multiplexing the uplink control information into the configured grant physical uplink shared channel transmission with the same value of CORESET pool index parameter;

selecting the configured grant configuration based on the SRS resource set index, and multiplexing the uplink control information into the configured grant physical uplink shared channel transmission with the same SRS resource set index; and selecting the configured grant configuration based on transmission configuration indication state, and multiplexing the uplink control information into the configured grant physical uplink shared channel transmission with the same transmission configuration indication state.

In an embodiment, the device further includes at least one of the following:

cancelling physical uplink control channel transmission;

values of the SRS resource set index parameter in the first configured grant configuration and the second configured grant configuration are different;

the corresponding value of CORESET pool index parameter and/or SRS resource set index in the first group of uplink transmission are the same;

the corresponding value of CORESET pool index parameter and/or SRS resource set index in the second group of uplink transmission are the same;

the first group of uplink transmission and the second group of uplink transmission are respectively associated with the first value and the second value of the CORESET pool index parameter;

the first group of uplink transmission and the second group of uplink transmission are respectively associated with the third value and the fourth value of the SRS resource set index;

dividing the uplink transmission into the first group of uplink transmission and the second group of uplink transmission includes: dividing the uplink transmission into the first group of uplink transmission and the second group of uplink transmission based on the value of CORESET pool index parameter; and/or dividing the uplink transmission into the first group of uplink transmission and the second group of uplink transmission based on the SRS resource set index;

the performing at least one configured grant physical uplink shared channel transmission based on the second pre-defined rule includes at least one of the following:

if a priority of the physical uplink control channel transmission in the first group of uplink transmission is higher than a priority of the first configured grant configuration or the second configured grant configuration in the first group of uplink transmission, multiplexing the uplink control information into the corresponding first configured grant configuration or the second configured grant configuration;

if a priority of the physical uplink control channel transmission in the second group of uplink transmission is higher than a priority of the first configured grant configuration or the second configured grant configuration in the second group of uplink transmission, multiplexing the uplink control information into the corresponding first configured grant configuration or the second configured grant configuration.

In an embodiment, the cancelling the physical uplink control channel transmission includes at least one of the following:

if the priority of the physical uplink control channel transmission in the first group of uplink transmission is lower than the priority of the first configured grant configuration or the second configured grant configuration in the first group of uplink transmission, cancelling the physical uplink control channel transmission;

if the priority of the physical uplink control channel transmission in the second group of uplink transmission is lower than the priority of the first configured grant configuration or the second configured grant configuration in the second group of uplink transmission, cancelling the physical uplink control channel transmission;

cancelling the physical uplink control channel transmission in the first group of uplink transmission;

cancelling the physical uplink control channel transmission in the second group of uplink transmission.

In an embodiment, the device further includes at least one of the following:

the radio resource control signaling includes at least one of a configured grant configuration information element, a period parameter, a time domain allocation parameter, an SRS resource set index parameter, an associated configured grant configuration index parameter, a configured grant configuration to be added and modified list parameter, a physical layer priority index parameter and a CORESET pool index parameter;

the downlink control information includes at least one of a priority indication field, a transmission configuration indication field and an SRS resource set indicator field;

the at least one configured grant configuration includes a first configured grant configuration and/or a second configured grant configuration;

the at least one configured grant configuration is configured to transmit at least two configured grant physical uplink shared channels that fully or partially overlap in time domain; and the at least one configured grant configuration includes the SRS resource set index parameter.

In an embodiment, the device further includes at least one of the following:

the at least two configured grant physical uplink shared channels fully or partially overlapping in time domain are associated with different values of the CORESET pool index parameter; and the at least two configured grant physical uplink shared channels fully or partially overlapping in time domain are associated with different values of the SRS resource set index parameter.

In an embodiment, the device further includes at least one of the following:

the CORESET pool index parameter is associated with the SRS resource set index parameter;

a value of the CORESET pool index parameter is associated with a value of the SRS resource set index parameter;

values of the SRS resource set index parameter in at least two configured grant configurations are different; and the at least two configured grant physical uplink shared channels fully or partially overlapping in time domain are associated to different values of the CORESET pool index parameter, and the association is based on the SRS resource set index parameter in the configured grant configuration.

The processing device provided by the embodiments of the present application can execute the technical solutions shown in the above method embodiments. The implementation principles and beneficial effects are similar and will not be described again here.

Figure 15:
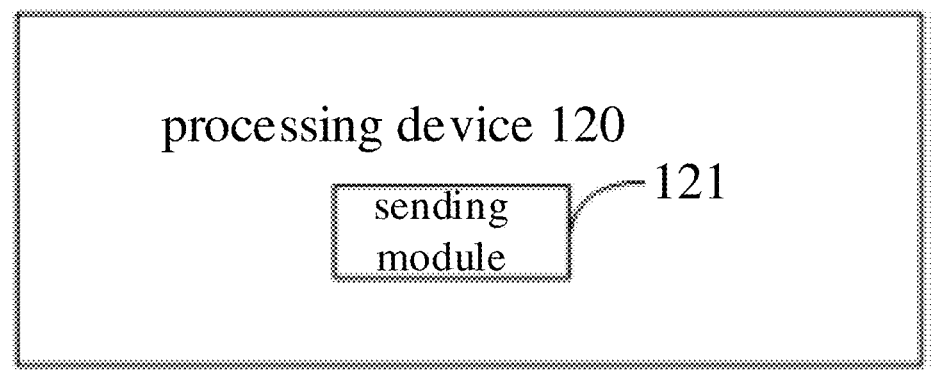
FIG. 15 is a second schematic structural diagram of a processing device according to an embodiment of the present application.

As shown in FIG. 15, FIG. 15 is a second schematic structural diagram of a processing device according to an embodiment of the present application. The device may be mounted on or be the network device in the above method embodiment. As shown in FIG. 15, the processing device 120 includes:

a sending module 121, configured to send radio resource control signaling and/or downlink control information, so that the terminal device determines at least one configured grant configuration based on the radio resource control signaling and/or downlink control information.

In an embodiment, the method for determining the configured grant configuration includes at least one of the following:

selecting, by the terminal device, a first configured grant configuration and a second configured grant configuration whose time domain resources are fully overlapping;

selecting, by the terminal device, the first configured grant configuration and the second configured grant configuration whose time domain resources overlap;

adding an associated configured grant configuration index parameter, and selecting, by the terminal device, the associated first configured grant configuration and second configured grant configuration;

adding one configured grant configuration to be added and modified list parameter, and selecting, by the terminal device, the first configured grant configuration and the second configured grant configuration from the two configured grant configuration to be added and modified list parameters respectively;

selecting, by the terminal device, the first configured grant configuration and the second configured grant configuration with the same priority;

selecting, by the terminal device, the first configured grant configuration and the second configured grant configuration with different priorities; and dividing, by the terminal device, the configured grant configuration into a first group of configured grant configuration and a second group of configured grant configuration, and selecting the first configured grant configuration and the second configured grant configuration based on a first pre-defined rule.

In an embodiment, the dividing, by the terminal device, the configured grant configuration into the first group of configured grant configuration and the second group of configured grant configuration includes at least one of the following:

dividing, by the terminal device, the configured grant configuration into the first group of configured grant configuration and the second group of configured grant configuration based on a value of CORESET pool index parameter; and dividing, by the terminal device, the configured grant configuration into the first group of configured grant configuration and the second group of configured grant configuration based on an SRS resource set index.

In an embodiment, the device further includes at least one of the following:

the radio resource control signaling includes at least one of a configured grant configuration information element, a period parameter, a time domain allocation parameter, an SRS resource set index parameter, an associated configured grant configuration index parameter, a configured grant configuration to be added and modified list parameter, a physical layer priority index parameter and a CORESET pool index parameter;

the downlink control information includes at least one of a priority indication field, a transmission configuration indication field and an SRS resource set indicator field;

the at least one configured grant configuration includes a first configured grant configuration and/or a second configured grant configuration;

the at least one configured grant configuration is configured to transmit at least two fully overlapping or partially overlapping configured grant physical uplink shared channels in time domain; and the at least one configured grant configuration includes the SRS resource set index parameter.

In an embodiment, the device further includes at least one of the following:

the at least two configured grant physical uplink shared channels fully or partially overlapping in time domain are associated with different values of the CORESET pool index parameter; and the at least two configured grant physical uplink shared channels fully or partially overlapping in time domain are associated with different values of the SRS resource set index parameter.

In an embodiment, the device further includes at least one of the following:

the CORESET pool index parameter is associated with the SRS resource set index parameter;

a value of the CORESET pool index parameter is associated with a value of the SRS resource set index parameter;

values of the SRS resource set index parameter in at least two configured grant configurations are different; and the at least two configured grant physical uplink shared channels fully or partially overlapping in time domain are associated to different values of the CORESET pool index parameter, and the association is based on the SRS resource set index parameter in the configured grant configuration.

The processing device provided by the embodiments of the present application can execute the technical solutions shown in the above method embodiments. The implementation principles and beneficial effects are similar and will not be described again here.

Figure 16:
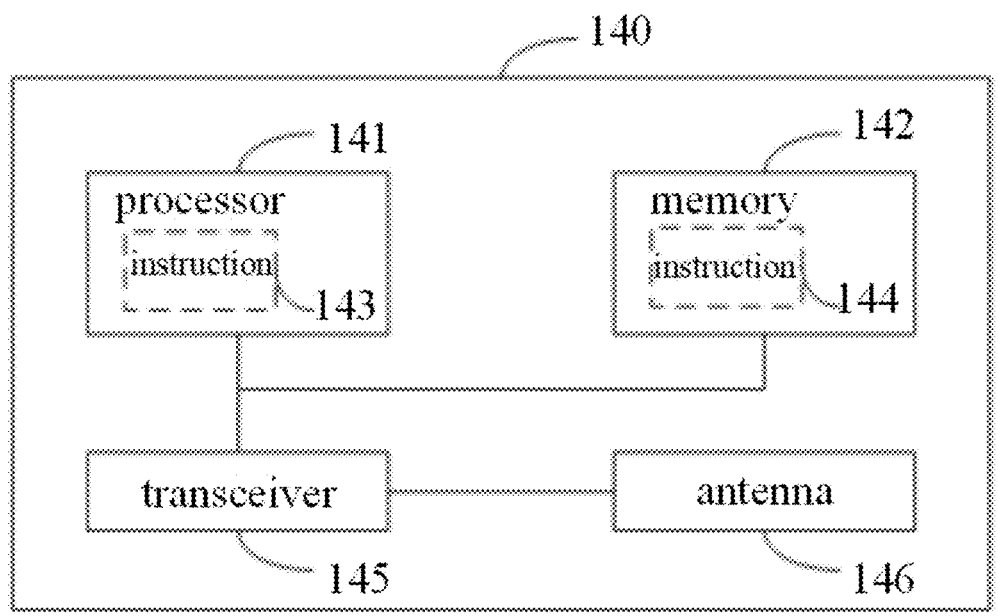
FIG. 16 is a schematic structural diagram of a communication device according to an embodiment of the present application.

Referring to FIG. 16, which is a schematic structural diagram of a communication device according to an embodiment of the present application. As shown in FIG. 16, the communication device 140 described in this embodiment may be the terminal device (or a component that can be used for the terminal device) or a network device (or a component that can be used for the network device) mentioned in the previous method embodiment. The communication device 140 may be used to implement the method corresponding to the terminal device or network device described in the above method embodiment. For details, please refer to the description in the above method embodiment.

The communication device 140 may include one or more processors 141, which may also be called a processing unit, and may implement certain control or processing functions. The processor 141 may be a general-purpose processor or a special-purpose processor, or the like. For example, it can be a baseband processor or a central processing unit. The baseband processor can process communication protocols and communication data, and the central processing unit can control communication equipment, execute software programs, and process data of software programs.

In an embodiment, the processor 141 may also store instructions 143 or data (e.g., intermediate data). In an embodiment, the instruction 143 may be executed by the processor 141, so that the communication device 140 performs the method corresponding to the terminal device or network device described in the above method embodiment.

In an embodiment, the communication device 140 may include a circuit, which may implement the functions of sending or receiving or communicating in the foregoing method embodiments.

In an embodiment, the communication device 140 may include one or more memories 142 on which instructions 144 may be stored. The instructions may be executed on the processor 141, causing the communication device 140 to perform the method described in the above method embodiment.

In an embodiment, data may also be stored in the memory 142. The processor 141 and the memory 142 can be provided separately or integrated together.

In an embodiment, the communication device 140 may also include a transceiver 145 and/or an antenna 146. The processor 141 may be called a processing unit and controls the communication device 140 (terminal device or core network device or radio access network device). The transceiver 145 may be called a transceiver unit, a transceiver, a transceiver circuit, a transceiver, etc., and is used to implement the transceiver function of the communication device 140.

In an embodiment, if the communication device 140 is used to implement operations corresponding to the terminal devices in the above embodiments, for example, radio resource control signaling and/or downlink control information may be received by the transceiver 145; and, the processor 141 determines at least one configured grant configuration based on radio resource control signaling and/or downlink control information.

In an embodiment, the specific implementation process of the processor 141 and the transceiver 145 can be referred to the relevant descriptions of the above embodiments, and will not be described again here.

In an embodiment, if the communication device 140 is used to implement operations corresponding to the network devices in the above embodiments, for example: the transceiver 145 may send radio resource control signaling and/or downlink control information, so that the terminal device determines at least one configured grant configuration based on radio resource control signaling and/or downlink control information.

In an embodiment, the specific implementation process of the processor 141 and the transceiver 145 can be referred to the relevant descriptions of the above embodiments, and will not be described again here.

The processor 141 and the transceiver 145 described in the present application can be implemented on an Integrated Circuit (IC), an analog integrated circuit, a Radio Frequency Integrated Circuit (RFIC), a mixed-signal integrated circuit, an Application Specific Integrated Circuit (ASIC), a Printed Circuit Board (PCB), an electronic equipment, etc. The processor 141 and the transceiver 145 can also be manufactured using various integrated circuit process technologies, such as Complementary Metal Oxide Semiconductor (CMOS), N Metal-Oxide-Semiconductor (NMOS), Positive channel Metal Oxide Semiconductor (PMOS), BJT, bipolar CMOS (BiCMOS), silicon germanium (SiGe), gallium arsenide (GaAs), etc.

In the present application, the communication device can be a terminal device (such as a mobile phone) or a network device (such as a base station). The details need to be determined according to the context, and the terminal device can be implemented in various forms. For example, the terminal devices described in the present application may include mobile phones, tablet computers, notebook computers, PDAs, personal digital assistants (PDA), Portable Media Player (PMP), navigation devices, wearable devices, smart bracelets, pedometers and other mobile terminals, as well as fixed terminal equipment such as digital TVs and desktop computers.

Although in the above description of the embodiments, the communication device is described using a terminal device or a network device as an example, the scope of the communication device described in the present application is not limited to the above-mentioned terminal device or network device, and the structure of the communication device may not be limited by FIG. 16. The communication device may be a stand-alone device or may be part of a larger device.

An embodiment of the present application also provides a communication system, including: a terminal device as in any of the above embodiments; and a network device as in any of the above embodiments.

An embodiment of the present application also provides a communication device, including a memory and a processor. A processing program is stored on the memory. When the processing program is executed by the processor, the steps of the processing method in any of the above embodiments are implemented.

The communication device in the present application can be a terminal device (such as a mobile phone) or a network device (such as a base station). The specific meaning needs to be clarified according to the context.

The embodiment of the present application also provides a storage medium. The storage medium stores a processing program, and when the processing program is executed by the processor, the steps of the processing method in any of the above embodiments are implemented.

The communication device and the storage medium embodiments provided by the embodiments of the present application may include all the technical features of any of the above processing method embodiments. The expansion and explanation contents of the description are basically the same as those of the above-mentioned method embodiments, and will not be described again here.

Embodiments of the present application also provide a computer program product. The computer program product includes a computer program code, when the computer program code is run on the computer, the computer is caused to perform the methods in the above various possible implementations.

An embodiment of the present application also provides a chip, including a memory and a processor. The memory is used to store computer programs. The processor is used to call and run the computer program from the memory, so that the device equipped with the chip executes the methods in the above various possible implementations.

It can be understood that the above scenarios are only examples and do not constitute a limitation on the application scenarios of the technical solutions provided by the embodiments of the present application. The technical solution of the present application can also be applied to other scenarios. For example, those of ordinary skill in the art know that with the evolution of system architecture and the emergence of new business scenarios, the technical solutions provided in the embodiments of the present application are also applicable to similar technical problems.

The above serial numbers of the embodiments of the present application are only for description and do not represent the advantages and disadvantages of the embodiments.

The steps in the methods of the embodiments of the present application can be sequentially adjusted, combined, and deleted according to actual needs.

The units in the device of the embodiments of the present application can be merged, divided, and deleted according to actual needs.

In the present application, the same or similar terms, concepts, technical solutions and/or application scenario descriptions are generally described in detail only the first time they appear. When it appears again later, for the sake of brevity, it is generally not repeated. When understanding the technical solutions and other content of the present application, the same or similar term concepts, technical solutions and/or application scenario descriptions that are not described in detail later can refer to the relevant previous detailed descriptions.

In the present application, each embodiment is described with its own emphasis. For parts that are not detailed or recorded in a certain embodiment, please refer to the relevant descriptions of other embodiments.

The technical features of the technical solution of the present application can be combined in any way. To simplify the description, all possible combinations of the technical features in the above embodiments are not described. However, as long as there is no contradiction in the combination of these technical features, it should be considered to be within the scope of the present application.

Through the above description of the implementation, those skilled in the art can clearly understand that the above embodiment methods can be implemented by software plus the necessary general hardware platform, or by hardware, but in many cases the former is a better implementation. Based on this understanding, the technical solution of the present application essentially or the part that contributes to the existing technology can be embodied in the form of a software product, and the computer software product is stored in one of the above storage media (such as ROM/RAM, disk, optical disk), including several instructions to cause a terminal device (which can be a mobile phone, a computer, a server, a controlled terminal, or a network device, etc.) to execute the method of each embodiment of the present application.

In the above embodiments, it can be implemented in whole or in part by software, hardware, firmware, or any combination thereof. When implemented using software, it may be implemented in whole or in part in the form of a computer program product. The computer program product includes one or more computer instructions. When computer program instructions are loaded and executed on a computer, processes or functions according to embodiments of the present application are generated in whole or in part. The computer may be a general purpose computer, a special purpose computer, a computer network, or other programmable device. The computer instruction may be stored in or transmitted from one computer-readable storage medium to another computer-readable storage medium. For example, the computer instruction may be transmitted by wired or wireless means from one website, computer, server, or data center to another website, computer, server, or data center. Computer-readable storage media can be any available media that can be accessed by a computer or a data storage device such as a server, data center, or other integrated media that contains one or more available media. Available media may be magnetic media (e.g., floppy disk, storage disk, tape), optical media (e.g., DVD), or semiconductor media (e.g., Solid State Disk (SSD)), etc.

The above are only some embodiments of the present application, and are not intended to limit the scope of the present application. Any equivalent structure or equivalent process transformation made using the contents of the specification and drawings of the present application, or directly or indirectly applied in other related technical fields, shall be similarly included in the scope of the present application.

What is claimed is:

1. A processing method, comprising:
   determining at least two configured grant configuration based on radio resource control signaling and/or downlink control information; and
   transmitting at least two configured grant physical uplink shared channels that fully or partially overlap in time domain based on the at least two configured grant configuration, wherein values of sounding reference signal (SRS) resource set index parameter of the at least two configured grant configuration are different.

2. The method according to claim 1, wherein the configured grant configuration comprises a first configured grant configuration and/or a second configured grant configuration, and the method further comprises at least one of the following:
   the radio resource control signaling comprises at least one of a configured grant configuration information element, a period parameter, a time domain allocation parameter, the SRS resource set index parameter, an associated configured grant configuration index parameter, a configured grant configuration to be added and modified list parameter, a physical layer priority index parameter or a control resource set (CORESET) pool index parameter; or
   the downlink control information comprises at least one of a priority indication field, a transmission configuration indication field or an SRS resource set indicator field.

3. The method according to claim 2, wherein the method for determining the configured grant configuration comprises selecting the first configured grant configuration and the second configured grant configuration whose time domain resources are fully or partially overlapping, and further comprises at least one of the following:
   selecting the first configured grant configuration and the second configured grant configuration which are associated;
   selecting the first configured grant configuration and the second configured grant configuration from the two configured grant configuration to be added and modified list parameters respectively;
   selecting the first configured grant configuration and the second configured grant configuration with the same priority or different priorities; or
   dividing the configured grant configuration into a first group of configured grant configuration and a second group of configured grant configuration, and selecting the first configured grant configuration and the second configured grant configuration based on a first predefined rule.

4. The method according to claim 3, wherein the dividing the configured grant configuration into the first group of configured grant configuration and the second group of configured grant configuration comprises at least one of the following:

dividing the configured grant configuration into the first group of configured grant configuration and the second group of configured grant configuration based on a value of the CORESET pool index parameter; or dividing the configured grant configuration into the first group of configured grant configuration and the second group of configured grant configuration based on a sounding reference signal (SRS) resource set index.

5. The method according to claim 3, wherein the selecting the first configured grant configuration and the second configured grant configuration based on the first pre-defined rule comprises at least one of the following:

in response to that the first group of configured grant configuration only comprises the first configured grant configuration or the second configured grant configuration, directly selecting the first configured grant configuration or the second configured grant configuration;

in response to that the second group of configured grant configuration only comprises the first configured grant configuration or the second configured grant configuration, directly selecting the first configured grant configuration or the second configured grant configuration;

in response to that the first group of configured grant configuration at least comprises the first configured grant configuration and the second configured grant configuration with different priorities, selecting the first configured grant configuration or the second configured grant configuration with a higher priority;

in response to that the second group of configured grant configuration at least comprises the first configured grant configuration and the second configured grant configuration with different priorities, selecting the first configured grant configuration or the second configured grant configuration with a higher priority;

in response to that the first group of configured grant configuration at least comprises the first configured grant configuration and the second configured grant configuration with the same priority, selecting the first configured grant configuration or the second configured grant configuration with a smaller value of a configured grant configuration index parameter; or in response to that the second group of configured grant configuration at least comprises the first configured grant configuration and the second configured grant configuration with the same priority, selecting the first configured grant configuration or the second configured grant configuration with a smaller value of the configured grant configuration index parameter.

6. The method according to claim 3, further comprising at least one of the following:

the first group of configured grant configuration and the second group of configured grant configurations are respectively associated with a first value and a second value of the CORESET pool index parameter; or the first group of configured grant configuration and the second group of configured grant configuration are respectively associated with a third value and a fourth value of an SRS resource set index.

7. The method according to claim 2, wherein the transmitting the at least one configured grant physical uplink shared channel based on the at least one configured grant configuration comprises:

in response to that the physical uplink control channel transmission overlaps with the at least one configured grant physical uplink shared channel transmission in time domain, multiplexing uplink control information transmitted on a physical uplink control channel into the at least one configured grant physical uplink shared channel transmission.

8. The method according to claim 7, wherein the multiplexing the uplink control information transmitted on the physical uplink control channel into the at least one configured grant physical uplink shared channel transmission comprises at least one of the following:

dividing uplink transmission into a first group of uplink transmission and a second group of uplink transmission, and performing at least one configured grant physical uplink shared channel transmission based on a second pre-defined rule;

selecting the configured grant configuration based on the value of the CORESET pool index parameter, and multiplexing the uplink control information into the configured grant physical uplink shared channel transmission with the same value of the CORESET pool index parameter;

selecting the configured grant configuration based on the value of the SRS resource set index, and multiplexing the uplink control information into the configured grant physical uplink shared channel transmission with the same SRS resource set index; or selecting the configured grant configuration based on transmission configuration indication state, and multiplexing the uplink control information into the configured grant physical uplink shared channel transmission with the same transmission configuration indication state.

9. The method according to claim 8, further comprising:

canceling physical uplink control channel transmission;

the corresponding value of the CORESET pool index parameter and/or SRS resource set index in the first group of uplink transmission being the same;

the corresponding value of the CORESET pool index parameter and/or SRS resource set index in the second group of uplink transmission being the same;

the first group of uplink transmission and the second group of uplink transmission being respectively associated with the first value and the second value of the CORESET pool index parameter;

the first group of uplink transmission and the second group of uplink transmission being respectively associated with the third value and the fourth value of the SRS resource set index;

wherein the dividing the uplink transmission into the first group of uplink transmission and the second group of uplink transmission comprises:

dividing the uplink transmission into the first group of uplink transmission and the second group of uplink transmission based on the value of the CORESET pool index parameter; and/or dividing the uplink transmission into the first group of uplink transmission and the second group of uplink transmission based on the value of the SRS resource set index;

the performing at least one configured grant physical uplink shared channel transmission based on the second pre-defined rule comprises at least one of the following:

in response to that a priority of the physical uplink control channel transmission in the first group of uplink transmission is higher than a priority of the first configured grant configuration or the second configured grant configuration in the first group of uplink transmission, multiplexing the uplink control information into the corresponding first configured grant configuration or the second configured grant configuration; or in response to that a priority of the physical uplink control channel transmission in the second group of uplink transmission is higher than a priority of the first configured grant configuration or the second configured grant configuration in the second group of uplink transmission, multiplexing the uplink control information into the corresponding first configured grant configuration or the second configured grant configuration.

10. The method according to claim 9, wherein the canceling the physical uplink control channel transmission comprises at least one of the following:

in response to that the priority of the physical uplink control channel transmission in the first group of uplink transmission is lower than the priority of the first configured grant configuration or the second configured grant configuration in the first group of uplink transmission, canceling the physical uplink control channel transmission;

in response to that the priority of the physical uplink control channel transmission in the second group of uplink transmission is lower than the priority of the first configured grant configuration or the second configured grant configuration in the second group of uplink transmission, canceling the physical uplink control channel transmission;

canceling the physical uplink control channel transmission in the first group of uplink transmission; or canceling the physical uplink control channel transmission in the second group of uplink transmission.

11. A communication device, comprising: a memory, a processor, and a processing program stored on the memory and executable on the processor, wherein when the processing program is executed by the processor, the processing method according to claim 1 is implemented.

12. A processing method, comprising:

sending radio resource control signaling and/or downlink control information, so that a terminal device determines at least two configured grant configuration based on the radio resource control signaling and/or the downlink control information; and transmitting at least two configured grant physical uplink shared channels that fully or partially overlap in time domain based on the at least two configured grant configuration, wherein values of sounding reference signal (SRS) resource set index parameter of the at least two configured grant configuration are different.

13. The method according to claim 12, wherein the configured grant configuration comprises a first configured grant configuration and/or a second configured grant configuration, and the method further comprises at least one of the following:

the radio resource control signaling comprises at least one of a configured grant configuration information element, a period parameter, a time domain allocation parameter, an SRS resource set index parameter, an associated configured grant configuration index parameter, a configured grant configuration to be added and modified list parameter, a physical layer priority index parameter or a control resource set (CORESET) pool index parameter; or the downlink control information comprises at least one of a priority indication field, a transmission configuration indication field or an SRS resource set indicator field.

14. The method according to claim 13, wherein the method for determining the configured grant configuration comprises selecting, by the terminal device, the first configured grant configuration and the second configured grant configuration whose time domain resources are fully or partially overlapping, and further comprises at least one of the following:

adding an associated configured grant configuration index parameter, and selecting, by the terminal device, the associated first configured grant configuration and second configured grant configuration;

adding one configured grant configuration to be added and modified list parameter, and selecting, by the terminal device, the first configured grant configuration and the second configured grant configuration from the two configured grant configuration to be added and modified list parameters respectively;

selecting, by the terminal device, the first configured grant configuration and the second configured grant configuration with the same priority or different priorities; or dividing, by the terminal device, the configured grant configuration into a first group of configured grant configuration and a second group of configured grant configuration, and selecting the first configured grant configuration and the second configured grant configuration based on a first pre-defined rule.

15. The method according to claim 14, wherein the dividing, by the terminal device, the configured grant configuration into the first group of configured grant configuration and the second group of configured grant configuration comprises at least one of the following:

dividing, by the terminal device, the configured grant configuration into the first group of configured grant configuration and the second group of configured grant configuration based on a value of the CORESET pool index parameter; or dividing, by the terminal device, the configured grant configuration into the first group of configured grant configuration and the second group of configured grant configuration based on a sounding reference signal (SRS) resource set index.

16. A non-transitory computer-readable storage medium, wherein a computer program is stored on the non-transitory computer-readable storage medium, and when the computer program is executed by a processor, the processing method according to claim 1 is implemented.

* * * * *